US012566776B2

(12) United States Patent
Yoon et al.

(10) Patent No.: US 12,566,776 B2
(45) Date of Patent: Mar. 3, 2026

(54) CROSS-GRID REPLICATION WITHIN A DISTRIBUTED STORAGE SYSTEM

(71) Applicant: NetApp, Inc., San Jose, CA (US)

(72) Inventors: Song Guen Yoon, Surrey (CA); Samuel Christian Veloso, Vancouver (CA); Gregory Kent, Vancouver (CA); Blake Edwards, Vancouver (CA); Oliver Seiler, Chilliwack (CA)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/616,662

(22) Filed: Mar. 26, 2024

(65) Prior Publication Data

US 2025/0307263 A1     Oct. 2, 2025

(51) Int. Cl.
G06F 16/27 (2019.01)
G06F 16/23 (2019.01)

(52) U.S. Cl.
CPC .......... G06F 16/27 (2019.01); G06F 16/2365 (2019.01)

(58) Field of Classification Search
CPC ............................. G06F 16/27; G06F 16/2365
See application file for complete search history.

(56) References Cited

U.S. PATENT DOCUMENTS 11,487,787 B2 * 11/2022 Reddy .................... G06F 16/273
11,570,243 B2 * 1/2023 Camargos ........... H04L 67/1048

11,782,624 B2 * 10/2023 Yang ..................... G06F 3/0685
                                                              711/154
12,147,394 B2 * 11/2024 Kashi Visvanathan ......................
                                                              G06F 16/185
12,182,264 B2 * 12/2024 Sinha .................. G06F 11/1464
2006/0248045 A1 * 11/2006 Toledano .............. G06F 16/258
2011/0189440 A1 * 8/2011 Appleby ................. B29C 33/38
                                                              523/435
2022/0261390 A1 * 8/2022 Creasey .................. H04W 4/38
2023/0409535 A1 * 12/2023 Kashi Visvanathan ... H04L 9/14

OTHER PUBLICATIONS

Maddox, Kathy et al., "Compare Cross-Grid Replication And CloudMirror Replication," NetApp, https://docs.netapp.com/us-en/storagegrid-117/admin/grid-federation-compare-cgr-to-cloudmirror.html, 4 pages, Mar. 2, 2023.
Maddox, Kathy, "Use Multiple Storage Pools For Cross-Site Replication," NetApp, https://docs.netapp.com/us-en/storagegrid-116/ilm/using-multiple-storage-pools-for-cross-site-replication.html, 3 pages, Dec. 22, 2021.

(Continued)

*Primary Examiner* — Angelica Ruiz

(57) ABSTRACT

Various embodiments of the present technology generally relate to systems and methods for providing cross-grid replication within distributed storage systems. In an example, a method includes identifying an object for ingest into a first storage grid containing a first distributed storage system and replicating the object to one or more nodes within the first storage grid. The method may also include determining a cross-grid replication status of the object to a second storage grid containing a second distributed storage system and performing a cross-grid replication of the object to the second storage grid based on the cross-grid replication status of the object.

29 Claims, 9 Drawing Sheets

(56) References Cited

OTHER PUBLICATIONS

Maddox, Kathy et al., "What Is Cross-Grid Replication?," NetApp, https://docs.netapp.com/us-en/storagegrid-118/admin/grid-federation-what-is-cross-grid-replication.html, 9 pages, Nov. 27, 2023.
NetApp TechComm TV, YouTube Video for "Grid Federation And Replication In StorageGRID 11.7," https://www.youtube.com/watch?v=YJyWNIqBXVw, 1 page, May 15, 2023.

* cited by examiner

300

328   IDENTIFY AN OBJECT FOR INGEST INTO A FIRST GRID

330   REPLICATE THE OBJECT WTIHIN THE FIRST GRID

332   DETERMINE WHETHER THE OBJECT HAS BEEN CROSS-GRID REPLICATED TO A SECOND GRID

334   CROSS-GRID REPLICATE THE OBJECT TO THE SECOND GRID

600

660 IDENTIFY AN OBJECT FOR INGEST

662 QUEUE THE OBJECT IN A CLIENT QUEUE

664 TIMEOUT?

NO

YES

666 REMOVE OBJECT FROM CLIENT QUEUE

668 SCAN SCANNING LIST

670 TOKEN WITHIN TOKEN RANGE OF NODE?

NO

YES

674 LET ANOTHER NODE CROSS-GRID REPLICATE THE OBJECT

672 CROSS-GRID REPLICATION STATUS?

CGR INITIATED

CGR NOT INITIATED

676 CROSS-GRID REPLICATE THE OBJECT

CROSS-GRID REPLICATION WITHIN A DISTRIBUTED STORAGE SYSTEM

TECHNICAL FIELD

Various embodiments of the present technology generally relate to distributed storage systems. More specifically, embodiments of the present technology relate to systems and methods for cross-grid replication within distributed storage systems.

BACKGROUND

In the digital era, where the generation and consumption of data have reached unprecedented levels, there is an escalating dependence on advanced storage systems to efficiently manage and accommodate the ever-expanding volumes of information. One such storage system is a distributed storage system. A distributed storage system is a sophisticated infrastructure designed to efficiently store and manage vast amounts of data across multiple interconnected nodes or servers. Unlike traditional centralized storage systems, where all data is stored in a single location, distributed storage systems distribute data across a network of interconnected nodes, providing increased scalability, fault tolerance, and performance. This decentralized approach allows organizations to seamlessly expand their storage capacity by adding more nodes to the network, ensuring that the system can handle growing data volumes without becoming a bottleneck. Additionally, distributed storage systems often incorporate redundancy mechanisms and data replication strategies to enhance data durability and availability, reducing the risk of data loss in case of hardware failures or other unforeseen events. These systems are crucial in modern computing environments, supporting applications and services that demand high availability, reliability, and efficient access to data.

One advantage of distributed storage systems is the redundancy mechanisms provided by data replication. When an object, whether it be a file, data, or any other form of digital content, is ingested by a node within a storage grid of a distributed storage system, a dynamic process of replication is set into motion. This entails duplicating the object and distributing copies across multiple nodes within the storage grid. The objective is to enhance data reliability, fault tolerance, and accessibility. This redundancy mechanism not only safeguards against potential hardware failures or node outages but also contributes to optimized data retrieval and load balancing. As the system scales or experiences fluctuations in demand, the distributed nature of this replication process ensures that the storage grid remains resilient and responsive, forming a robust foundation for modern applications and services reliant on consistent and available data.

However, while single-storage grid replication or intra-grid replication in distributed storage systems offers advantages in terms of redundancy, it is not without its vulnerabilities. One notable concern is the potential for rogue administration, where unauthorized access to a node within the storage grid could compromise the integrity of replicated data. Additionally, the rise of ransomware poses a significant threat, as malicious actors could exploit the interconnected nature of replicated data, leading to widespread and simultaneous encryption, making it challenging to recover without proper safeguards. Furthermore, issues related to access loss may arise, especially in scenarios where changes to access permissions are not seamlessly propagated across all replicated copies, leading to inconsistencies in data accessibility. These weaknesses highlight the importance of implementing robust security measures, comprehensive access controls, and vigilant monitoring to mitigate the risks associated with single-storage grid replication in distributed storage systems.

Accordingly, there exists a need for improved enhanced and adaptive distributed storage systems including cross-grid replication processes, such as those provided herein.

The information provided in this section is presented as background information and serves only to assist in any understanding of the present disclosure. No determination has been made and no assertion is made as to whether any of the above might be applicable as prior art with regard to the present disclosure.

Overview

Technology is disclosed herein for systems and techniques for providing cross-grid replication between two or more storage grids within a distributed storage system. To address the vulnerabilities of conventional distributed storage systems, cross-grid replication emerges as a strategic solution to enhance data resilience and mitigate potential vulnerabilities. As data undergoes the initial ingestion process within a storage grid, traditional replication mechanisms come into play, ensuring redundancy by generating copies across nodes within the ingesting storage grid (e.g., intra-grid replication). However, the redundancy of data replication within a single storage grid still leaves distributed storage systems vulnerable to a variety of problems, such as rouge administration and ransomware attacks. As such, cross-grid replication can be implemented to further bolster a distributed storage system against such vulnerabilities.

The structure of a distributed storage system employing cross-grid replication is characterized by a network of interconnected storage grids. Upon the initial ingest of an object, traditional replication safeguards data integrity within the boundaries of the ingesting storage grid. Subsequently, cross-grid replication takes center stage, initiating the dissemination of replicated data not only within the originating storage grid but across multiple interconnected storage grids. This intricate process involves the creation of duplicate copies strategically dispersed across various geographical or organizational locations, forming a resilient tapestry of redundancy. The coordinated effort between storage grids ensures that replicated data is not only shielded against local storage grid failures but also provides a robust defense against broader disasters or outages that might impact an entire storage grid. This architectural approach significantly augments the reliability and durability of the distributed storage system, aligning it with the demands of modern data management.

As will be expanded on below, the benefits of cross-grid replication are multifaceted. Firstly, cross-grid replication significantly enhances data durability and availability by dispersing replicated copies across geographically diverse storage grids, minimizing the risk of data loss due to localized incidents. Secondly, cross-grid replication contributes to improved disaster recovery capabilities, as data redundancy is extended to different regions or data centers. This not only ensures business continuity but also enables swift recovery in the face of unforeseen events. Lastly, the distributed nature of cross-grid replication supports efficient load balancing, allowing organizations to optimize data access and retrieval across various storage grids, thereby improving overall system performance and responsiveness.

In essence, cross-grid replication emerges as a pivotal strategy within distributed storage systems, addressing the evolving demands of data management in the modern digital landscape.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

The accompanying drawings, which are incorporated into and constitute a part of this specification, illustrate one or more certain aspects and, together with the description of the example, serve to explain the principles and implementations of the certain examples.

Figure 1:
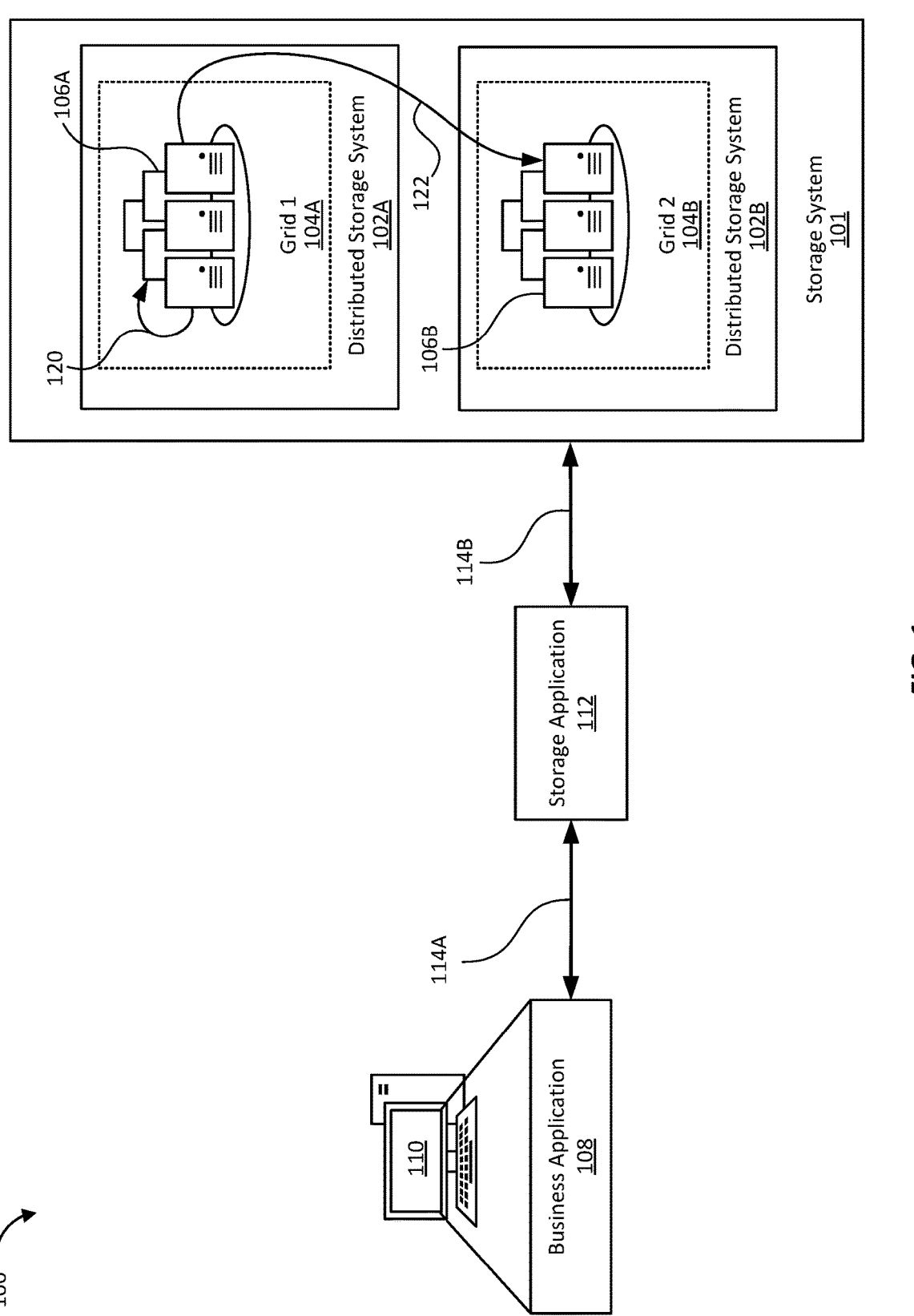
FIG. 1 illustrates an example operational environment for a system for providing cross-grid replication to a client device, according to an embodiment herein.

Some components or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

In the modern era, the escalating generation and consumption of data have necessitated the adoption of advanced storage solutions, leading to an increased reliance on distributed storage systems. These systems offer a scalable and efficient means of managing vast amounts of information by distributing data across interconnected nodes or servers. As organizations strive to cope with the exponential growth of digital data, distributed storage systems have become indispensable for their ability to provide high availability, reliability, and seamless scalability.

Traditional distributed storage systems often confine data replication to a single storage grid (hereinafter referred to as "intra-grid replication") which can leave the distributed storage system vulnerable to a variety of challenges and disadvantages. One significant concern is the heightened vulnerability to localized failures or storage grid outages. In such systems, if a storage grid experiences a hardware failure or becomes inaccessible, the replicated data within that storage grid becomes at risk, potentially leading to data loss and operational disruptions. Moreover, the limited scope of redundancy within a single storage grid leaves the entire system susceptible to a single point of failure, compromising data integrity and availability. Additionally, conventional distributed storage systems face difficulties in providing effective disaster recovery solutions, as the localized replication limits the geographical dispersal of redundant data. This constraint hinders the system's ability to withstand broader disasters or catastrophic events, impacting data resilience. Furthermore, scalability can be constrained, as expanding storage capacity within a single storage grid may lead to performance bottlenecks and increased management complexity.

To address the shortcomings of traditional distributed storage systems, systems and processes for cross-grid replication are provided herein. As will be expanded on below, cross-grid replication addresses the evolving demands of data management while fortifying distributed storage systems against the limitations associated with traditional distributed storage architectures. Unlike the limitations associated with intra-grid replication, cross-grid replication offers a comprehensive solution to the vulnerabilities identified in conventional models. By extending the replication process beyond the confines of a single storage grid, cross-grid replication ensures increased data resilience and mitigates the risks associated with localized failures or outages. The intricate network of interconnected storage grids allows for the strategic dispersal of replicated data across diverse geographical or organizational locations, significantly reducing the susceptibility to single points of failure. This architectural advancement not only enhances data durability and availability but also establishes a robust foundation for disaster recovery by enabling broader geographical dispersal of redundant data. Furthermore, cross-grid replication promotes scalability, enabling seamless expansion of storage capacity across interconnected storage grids without compromising performance or management efficiency. In essence, cross-grid replication emerges as a pivotal solution to fortify the limitations of traditional distributed storage systems, providing a more resilient and responsive framework for modern data management needs.

For example, cross-grid replication serves as a formidable safeguard against the insidious threats posed by ransomware vulnerabilities and rogue administrators within distributed storage systems. In traditional, single-storage grid replication models, the interconnected nature of replicated data could amplify the impact of ransomware attacks, leading to widespread encryption and potential data loss. Cross-grid replication addresses this concern by strategically distributing replicated copies across multiple storage grids. This dispersal not only limits the impact of ransomware to a specific storage grid but also enables swift recovery from unaffected replicas in other interconnected storage grids. Additionally, the decentralized nature of cross-grid replication introduces a layer of security against rogue administrators. Unauthorized access to a single storage grid does not equate to unfettered control over all replicated data, as cross-grid replication ensures that critical administrative functions are distributed across interconnected nodes, mitigating the risk of malicious manipulation. In essence, cross-grid replication acts as a proactive defense mechanism, fortifying distributed storage systems against the evolving threats of ransomware and unauthorized access.

Various embodiments of the present technology provide for a wide range of technical effects, advantages, and/or improvements to computing systems and components. For example, various embodiments may include one or more of the following technical effects, advantages, and/or improvements: 1) unconventional and non-routine operations to cross-grid replicate an object into a storage system having a different namespace; 2) dynamic integration of tokenization and cross-grid replication processes into traditional distributed storage systems; 3) automatically identifying objects that have yet to be cross-grid replicated to ensure that an object is replicated to a separate distributed storage system; 4) use of cross-grid replication to increase security against data loss, due to ransomware or outages; and/or 5) changing the manner in which a computing system ingest and store objects within distributed systems. Some embodiments include additional technical effects, advantages, and/or improvements to computing systems and components.

Turning now to the Figures, FIG. 1 illustrates an example operational environment for a system 100 for providing cross-grid replication to a client device 110, according to an embodiment herein. As shown, the client device 110 may execute a business application 108 to manage associated data. Data associated with the business application 108 may be managed and stored on a storage system 101. That is, the storage system may serve as a backbone for storing, retrieving, and managing the data generated by the business application 108. It should be appreciated, that while FIG. 1 illustrates a single client device 110 executing a single business application 108, in reality an organization or platform may include any number of client devices 110, each executing a separate instance of the business application 108. As such, it can be appreciated that the business application 108 may generate and require access to vast amounts of data stored on the storage system 101.

In the illustrated example, the storage system 101 includes two distributed storage systems 102A and 102B. At the core of each of the distributed storage systems 102A and 102B is a storage grid 104A and 104B, respectively. The storage grids 104A and 104B each include a logical framework that organizes and coordinates the storage and retrieval of data. The storage grids 104A and 104B may be software-defined, object-based storage solutions that support a single name space across multiple sites. That is, each of the storage grid 104A and 104B has its own namespace through which clients can access stored objects. As those skilled in the art readily appreciate, a namespace refers to a logical container or partition within a storage system where data is organized and managed based on predefined rules or criteria, enabling efficient data access, retrieval, and management. For example, the first storage grid 104A, as described herein, may be accessible via a first namespace while the second storage grid 104B is accessible via a second namespace.

Figure 9:
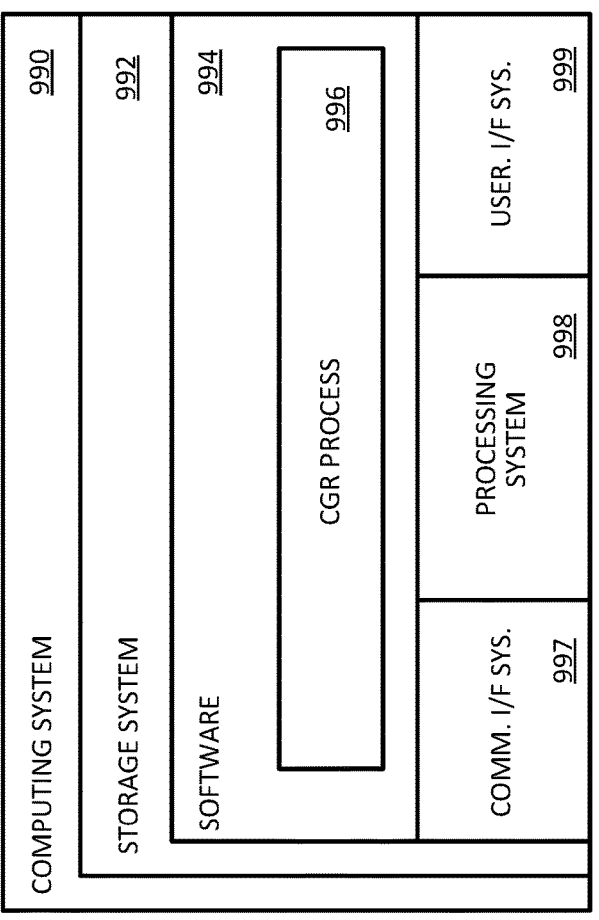
FIG. 9 shows an example computing device suitable for providing one or more steps of a cross-grid replication process, according to an embodiment herein.

As will be described in greater detail below with respect to FIG. 2, each of the storage grids 104A and 104B include multiple nodes or servers 106A and 106B, respectively, each equipped with storage capacity, forming a decentralized architecture. The servers 106A and 106B may be co-located with respect to each other or distributed across one or more data centers. Example servers 106A and 106B include web servers, application servers, virtual or physical servers, or any combination thereof, of which computing apparatus 990 in FIG. 9 is broadly representative.

As noted above, the distributed nature of the storage grids 104A and 104B allows for seamless expansion of storage capacity by adding more nodes or servers 106A and 106B to the network, ensuring the storage system 101 can handle growing data volumes without becoming a bottleneck. That is, the decentralized infrastructure provided by the distributed storage systems 102A and 102B allows for efficient management and storage of large volumes of data across the interconnected servers 106A and 106B. Unlike traditional centralized storage systems, where all data is stored in a single location, the distributed storage systems 102A and 102B distribute data across the servers 106A and 106B, providing increased scalability, fault tolerance, and performance. It should be appreciated that while FIG. 1 illustrates that the storage grids 104A and 104B as part of separate distributed storage systems 102A and 102B, in some cases the storage grids 104A and 104B may be part of the same distributed storage system.

As shown, the system 100 includes a storage application 112. The storage application 112 may act as an intermediary between the storage system 101 and the business application 108. That is, the interaction between the business application 108 and the storage system 101 involves a structured process to store and manage data efficiently. When a user, such as a user of the client device 110, interacts with the business application 108, creating, modifying, or retrieving data, the storage application 112 communicates with the storage system 101 to handle the underlying data storage operations. As such, the storage application 112 acts as an intermediary between the business application 108 and the storage system 101 to manage the seamless flow of data.

The client device 110 may communicate with the business application 108 and/or the storage application 112 via one or more internets and intranets, the Internet, wired and wireless networks, local area networks (LANs), wide area networks (WANs), or any other type of network or combination thereof. Examples of the client device 110 may include personal computers, tablet computers, mobile phones, gaming consoles, wearable devices, Internet of Things (IoT) devices, and any other suitable devices, of which computing apparatus 990 in FIG. 9 is also broadly representative.

When data needs to be stored, the business application 108 sends a request 114A to the storage application 112, specifying the type of operation (e.g., create, update, delete) and the relevant data. The storage application 112 then processes this request and interacts with the storage system 101 to store the data. This interaction may involve utilizing the distributed storage system 102A (or the distributed storage system 102B), where data is replicated or distributed across multiple nodes or servers for redundancy and fault tolerance. Conversely, when the business application 108 needs to retrieve data, it communicates with the storage application 112, which in turn queries the storage system 101 to fetch the required information. This retrieval process ensures that the business application 108 has access to the most up-to-date and accurate data stored within the storage system 101.

Throughout this interaction, the storage application 101 plays a crucial role in translating the data storage needs of the business application 108 into operations that are executed within the storage system 101. This collaboration enables the business application 108 to effectively store, manage, and retrieve data, contributing to the overall functionality and reliability of the business application 108.

In some cases, the business application 108 communicates with the distributed storage system 102A (or the distributed storage system 102B) by initiating an Input/Output (I/O) request 114A. For example, when the business application 108 requires access to or modification of data stored within the distributed storage system 102A, the business application 108 formulates a specific I/O request 114A, encapsulating details such as the type of operation (read, write, update), the targeted data, and any additional parameters. The request 114A is then transmitted through a designated storage interface or API (Application Programming Interface), here the storage application 112, which serves as the conduit between the business application 108 and the distributed storage system 102A. The storage application 112 interprets the I/O request 114A and routes the request 114B to the appropriate nodes within the distributed storage system 102A, which may span across multiple servers 106A or locations in the storage grid 104A.

In the example where the I/O request 114A is to store an object, such as a file or data, the storage grid 104A may perform one or more replication mechanisms to enable data redundancy and provide safeguards against hardware failures or other unforeseen events. As shown, when the I/O request 114A is received by the distributed storage system 102A, the storage grid 104A may perform a replication process 120 of the object within the storage grid 104A. That is, the replication process 120 may be an intra-grid replication process in which the object is ingested by the storage grid 104A and replicated (e.g., duplicate copies generated and stored) within the storage grid 104A upon ingest. The replication process 120 is described in greater detail below with respect to FIGS. 2-4.

In addition to the replication process 120, the storage grid 104A may also perform a cross-grid replication process 122. As will be described in greater detail below, the cross-grid replication process 122 may replicate the object to another storage grid, here, the storage grid 104B. By performing the cross-grid replication process 122, the storage system 101 enhances the object's resilience and fortifies against potential vulnerabilities. For example, by dispersing the replicated object between the storage grids 104A and 104B, the storage system 101 minimizes the risk and impact of localized failures or outages for the business application 108. That is, if the storage grid 104A suffers a failure, outage, or episodes of congestion, then the storage system 101 can provide the object that is replicated to the storage grid 104B to the business application 108. As those skilled in the art readily appreciate, the cross-grid replication process 122 ensures the integrity of the object and the availability of the object within the storage system 101.

Figure 2:
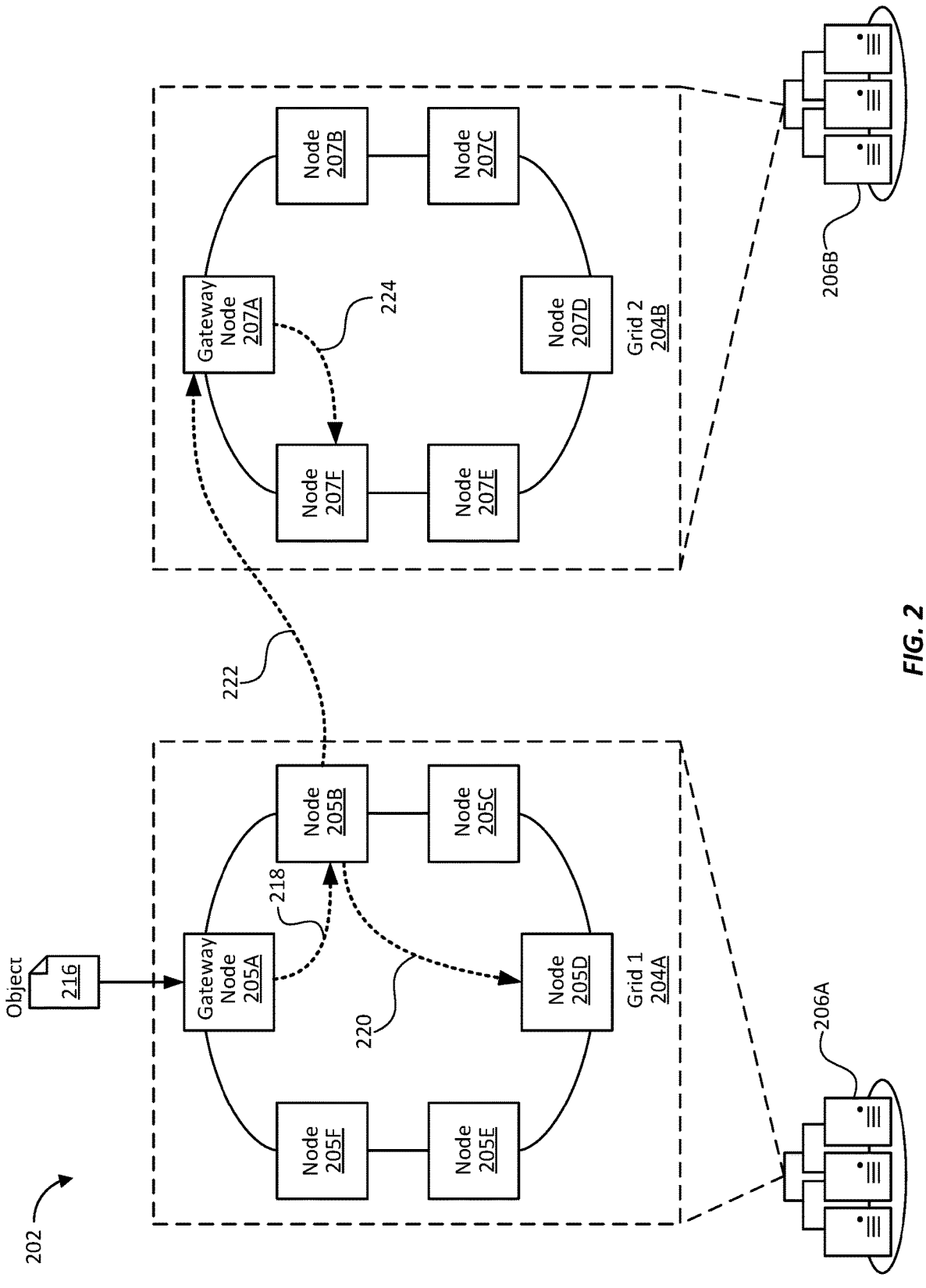
FIG. 2 illustrates an example distributed storage system for providing cross-grid replication, according to an embodiment herein.

Turning now to FIG. 2, an example distributed storage system 202 for providing cross-grid replication is illustrated, according to an embodiment herein. As shown, the distributed storage system 202, which may be the same or similar to the distributed storage systems 102A and/or 102B, includes two storage grids 204A and 204B, which may be the same or similar to the storage grids 104A and 104B. The storage grids 204A and 204B may be formed by servers 206A and 206B, respectively, which may be the same or similar to the servers 106A and 106B. As those skilled in the art readily appreciate, the servers 106A and 106B may collectively contribute to the organization and management of data across the storage grids 204A and 204B, respectively.

In particular, the servers 206A and 206B may serve as nodes within the storage grids 204A and 204B, respectively, thereby collectively providing the essential building blocks that constitute the storage grids 204A and 204B. As shown, each of the storage grids 204A and 204B include multiple nodes. For example, the storage grid 204A includes nodes 205A-F and the storage grid 204B includes nodes 207A-F. It should be appreciated that while only six nodes 205A-F and six nodes 207A-F are illustrated for the storage grids 204A and 204B, respectively, any number of nodes 205A-F and 207A-F may be included in each of the storage grids 204A and 204B. Additionally, although the distributed storage system 202 is illustrated as including two storage grids 204A and 204B, the distributed storage system 202 may include any number of storage grids 204A and 204B.

Each of the nodes 205A-F may serve a distinct function within the storage grid 204A, with some of the nodes 205A-F specializing in data storage, while others in data retrieval. Similarly, the nodes 207A-F may serve various functions within the storage grid 204B. In particular, the nodes 205A and 207A may be gateway nodes that serve as a crucial interface between the storage grids 204A and 204B, respectively, an external networks or applications, such as the business application 108. As gateway nodes, the nodes 205A and 207A manage the ingress and egress of objects, such as an object 216, handling requests from external sources, and ensure that objects are seamlessly ingested by the storage grids 204A and 204B, respectively.

Figure 3:
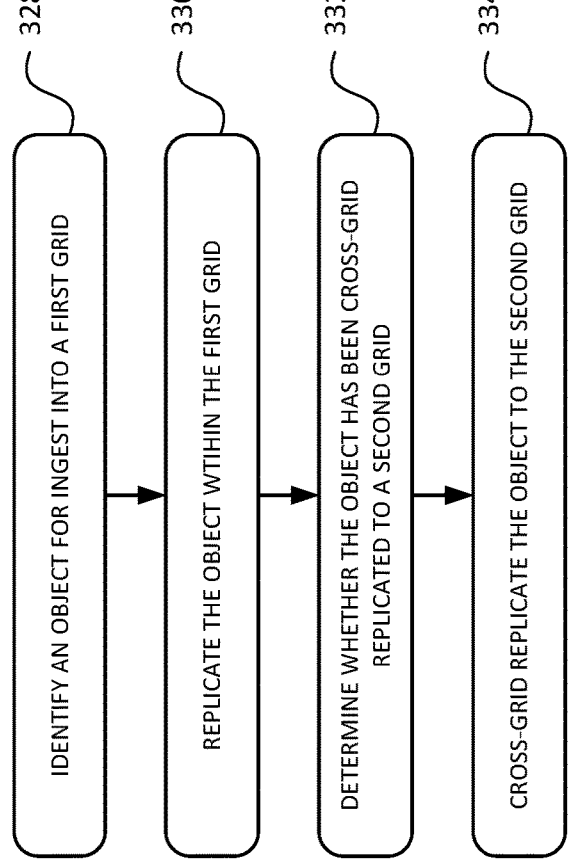
FIG. 3 illustrates an example process for performing cross-grid replication, according to an embodiment herein.

For ease of illustration, the remaining discussion of FIG. 2 is made with reference to FIG. 3. FIG. 3 provides a process 300 for performing cross-grid replication, according to an embodiment herein. While the process 300, which may be referred to herein as a cross-grid replication process, is described with respect to FIG. 2, it should be appreciated that it is equally applicable to other systems and components provided herein. Additionally, while the process 300 illustrates steps 328, 330, 332, and 334, the process 300 is not limited to these steps and may include additional steps or may lack one or more of these steps. That is, the steps 328-334 are provided to illustrate the cross-grid replication process, not limit it to these steps.

Returning now to FIG. 2, to begin the process 300, the object 216 may be identified for ingest into the storage grid 204A (328). In particular, the object 216 may be received from the storage application 112 working as an intermediary between the business application 108 and the distributed storage system 202. The business application 108 may have submitted an I/O request 114A for the distributed storage system 202 to save the object 216. While the following example is with respect to saving the object 216 within the distributed storage system 202, it should be appreciated that other operations of the object 216 are contemplated herein, such as retrieving the object 216, modifying the object 216, or sharing the object 216 with other client devices.

To ingest the object 216 into the distributed storage system 202, the gateway node 205A may initially receive the object 216. Specifically, the gateway node 205A may receive the object 216 through a data ingress process. Since the gateway node 205A serves as the entry point into the storage grid 204A, the gateway node 205A receives the object 216 and directs 218 the object 216, along with the associated save request from the business application 208, to an appropriate node within the storage grid 204A. As those skilled in the art readily appreciate, the gateway node 205A plays a central role in managing the overall data flow within the distributed storage system 202 by coordinating and distributing data based on the availability of the storage grid 204A.

Here, the gateway node 205A directs 218 the object 216, along with its associated save request, to the node 205B. The node 205B may be a storage node within the storage grid 204A. As indicated by its name, the storage node 205B stores and manages data within the distributed storage system 202. For example, the storage node 205B may be an individual server or computing system within the servers 206A that contributes to the overall storage capacity of the distributed storage system 202 and stores data, such as the object 216, as part of the ingest process.

In addition to storing and managing data, the storage node 205B may also perform one or more data replication processes. As noted above, when the object 216 is initially ingested into the distributed storage system 202, in particular into the storage grid 204A, an intra-grid replication process 220 may be performed to replicate the object 216 within the storage grid 204A (330). By performing the intra-grid replication process 220, multiple replicates (e.g., copies, duplicates) of the object 216 may be generated and stored within the storage grid 204A. As can be appreciated, by having replicates of the object 216 within the storage grid 204A, the system 202 can ensure high availability and durability of the object 216 for the business application 108.

Although the intra-grid replication process 220 is illustrated as replicating the object 216 to the node 205D, it should be appreciated that the object 216 may be replicated to two or more nodes 205B-F within the storage grid 204A. For example, the object 216 may be replicated to the nodes 205C, 205D, and 205E via the intra-grid replication process 220. It should also be appreciated that while the ingesting node 205B is illustrated as performing the intra-grid replication process 220, non-ingesting nodes 205C-F may perform the intra-grid replication process 220, depending on the availability and capacity of the nodes 205B-F.

As noted above, relying solely on intra-grid replication 220 for data availability can leave a distributed storage system vulnerable to a variety of problems. To safeguard against these problems the distributed storage system 202 may include systems and processes to perform cross-grid replication. For example, in addition to performing the intra-grid replication process 220, the storage node 205B may also perform a cross-grid replication process 222 (334). In some embodiments, to ensure that other nodes 205C-F within the storage grid 204A are not also performing the cross-grid replication process 222 for the object 216, the node 205B may first determine a cross-grid replication status (e.g., in-progress, completed, uninitiated) for the object 216 before performing the cross-grid replication process 222 (332). As will be described in greater detail below with respect to FIGS. 5-7, determining the cross-grid replication status of the object 216 may include, in some cases, checking a local cache of one or more of the nodes 205B-F to see if the cross-grid replication process 222 has been initiated. Table I provided below provides an illustrative example of a local cache for one of the nodes 205B-F indicating cross-grid replication status for each object ingested into the distributed storage system 202.

TABLE 1

| Object | Cross-Grid Replication Status |
|--------|-------------------------------|
| Object A | Completed |
| Object B | In-progress |
| Object 216 | Incomplete |

While the following discussion describes the storage node 205B performing the cross-grid replication process 222, it should be appreciated that other nodes within the storage grid 204A may perform the cross-grid replication process 222. That is, in the illustrated example, the storage node 205B is the ingesting node for the object 216 and is performing the cross-grid replication process 222, however, the node performing the cross-grid replication process 222 does not need to be the ingesting node. For example, the node 205D may perform the cross-grid replication process 222. Systems and processes used by the nodes 205B-F within the storage grid 204A to determine which node performs the cross-grid replication process 222 are described in greater detail below with respect to FIGS. 5-8.

When the storage node 205B performs the cross-grid replication process 222, the storage node 205B may establish a client connection with the storage grid 204B. Specifically, the storage node 205B may establish a client connection with the gateway node 207A of the storage grid 204B. The client connection, as used herein, refers to a communication link established between clients external to the gateway node 207A. Typically, external clients include the business application 108, however, via the cross-grid replication process 222, the storage node 205B acts as an external client when communicating with the gateway node 207A. As such, the client connection typically utilizes standard network protocols and communication methods, such as hypertext transfer protocol (HTTP).

The client connection established with the gateway nodes 205A and 207A, either from an external client such as the business application 108 or from a storage node on another storage grid via the cross-grid replication process 222, is distinct from the connections between nodes within the same storage grid. That is, the client connection established between the storage node 205B and the gateway node 207A is different than the internal connection between the storage node 205B and the other nodes 205A and 205C-F within the storage grid 204A. Similarly, the client connection established between the gateway node 207A and the storage node 205B is different than the internal connections between the gateway node 207A and the other nodes 207B-F within the storage grid 204B.

The client connection may differ from the internal connection between the nodes 205A-F within the storage grid 204A and the nodes 207A-F within the storage grid 204B at least by protocol. That is, the internal connection between nodes of the same storage grid may use specialized protocols that optimize efficient data replication and coordination, such as intern-node communication protocols specific to the distribute storage system 202 or even the storage grids 204A and/or 204B. In contrast, the client connection may use standard network protocols (e.g., HTTP, REST, or custom APIs) suitable for client-server communication over the internet.

The client connection may also differ from the internal connection between the nodes 205A-F within the storage grid 204A and the nodes 207A-F within the storage grid 204B by communication patterns. That is, the communication patterns involved in the internal connection between the nodes 204A-F and 207A-F and the client connections established by the gateway nodes 205A/207A embody distinct roles and functionalities. The nodes 205A-F and 207A-F engage in intricate, internal communication patterns, collaborating through peer-to-peer or client-server models to ensure tasks like data replication, synchronization, and load balancing. This inter-node communication is specialized, designed to optimize the storage grids 204A and 204B efficiency and data consistency. On the other hand, the communication pattern between the gateway node 205A/207B and external clients adheres to a client-server model, where clients initiate requests and the gateway node 205A/207A acts as an interface to the distributed storage system 202. This client-server interaction is characterized by standardized network protocols, facilitating seamless data ingress and egress between the external clients and the distributed storage infrastructure.

Once the storage node 205B establishes the client connection with the gateway node 207A, the gateway node 207A may direct 224 the cross-grid replication of the object 216 to the storage node 207F as part of the cross-grid replication process 222. Upon receipt, the storage node 207F may store the replicated object 216. Similar to the storage node 205B, the storage node 207F may be an individual server or computing system within the servers 206B that contributes to the overall storage capacity of the distributed storage system 202 and stores data, such as the replicated object 216.

Figure 4:
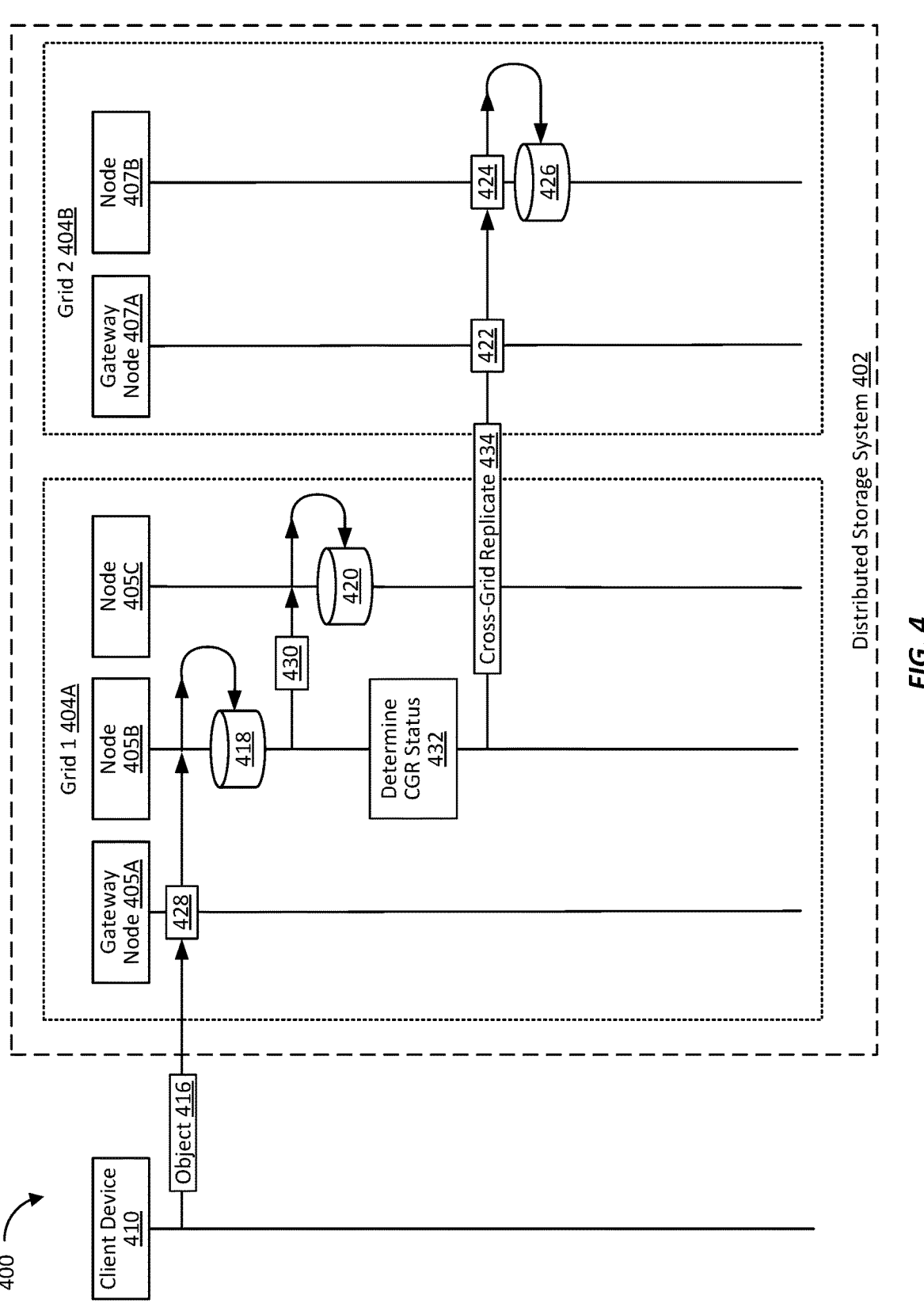
FIG. 4 illustrates an example flow for performing a cross-grid replication process, according to an embodiment herein.

Referring now to FIG. 4, an example flow 400 for performing a cross-grid replication process, such as the process 300, is illustrated, according to an embodiment herein. As shown, a client device 410, which may be the same or similar to the client device 110 may submit a request to save, edit, or otherwise modify an object 416. The object 416, similar to the object 216, may be a discrete unit of data or information, such as a file, document, image, video, audio file, or any other digital content. In particular, the client device 410 may submit the request to a distributed storage system 402. The distributed storage system 402 may be the same or similar to the distributed storage system 202. As noted above, the client device 410 may submit its request to the distributed storage system 402 via an API, such as the storage application 112, which in some cases, coordinates with the business application 108 executing on the client device 410.

In the illustrated example, the distributed storage system 402 includes two storage grids 404A and 404B, which may be the same or similar to the storage grids 204A and 204B, respectively. As such, each of the storage grids 404A and 404B may include multiple nodes, such as the storage grid 404A including a gateway node 405A and storage nodes 405B and 405C. Similarly, the storage grid 404B may include a gateway node 407A and a storage node 407B. The request from the client device 410 and the object 416 associated with the request may be received by the storage grid 404A. In particular, the gateway node 405A of the storage grid 404A receives the object 416 and its associated request (428).

Based on the availability and assigned responsibility of the storage nodes within the storage grid 404A, the gateway node 405A directs or routes the object 416 and its associated request to the storage node 405B. Upon receipt of the object 416, the storage node 405B may save the object 416 (418). In addition to saving the object 416, the storage node 405B may also replicate the object 416 within the storage grid 404A (430). That is, the storage node 405B may determine one or more storage nodes 405C within the storage grid 404A to replicate the object 416 to. As part of the intra-grid replication process, the storage node 405C replicates and stores the object 416 (420).

In addition to intra-grid replicating the object 416, the storage node 405B may also determine whether to initiate a cross-grid replication process. To determine whether to initiate a cross-grid replication process, the storage node 405B may determine a cross-grid replication (CGR) status 432 of the object 416. As will be expanded on in greater detail below, determining the CGR status 432 of the object 416 may include checking with other storage nodes within the storage grid 404A to see whether any of the storage nodes have already initiated the cross-grid replication process. In addition to determining whether any other storage nodes have initiated the cross-grid replication process for the object 416, the storage node 405B may also determine whether it is responsible for cross-grid replicating the object 416. These aspects of the cross-grid replication process are described in greater detail below with respect to FIGS. 5-7.

If the storage node 405B determines that the CGR status 432 of the object 416 indicates that a cross-grid replication process of the object 416 has not yet been initiated, then the storage grid 404A may initiate a cross-grid replication process (434). To initiate the cross-grid replication process (434), the storage node 405B may establish a client connection with the gateway node 407A of the storage grid 404B. In some cases, establishing the client connection may include undergoing one or more authentication or validation processes.

Once the client connection is established between the storage node 405B and the gateway node 407A, the storage node 405B initiates cross-grid replication (422) of the object 416. The gateway node 407A may process the cross-grid replication (422) request received from the storage node 405B and direct the cross-grid replication (422) request to the storage node 407B (424). Responsive to receiving the cross-grid replication (424) request, the storage node 407B may replicate and store the replicated object 426.

Figure 5:
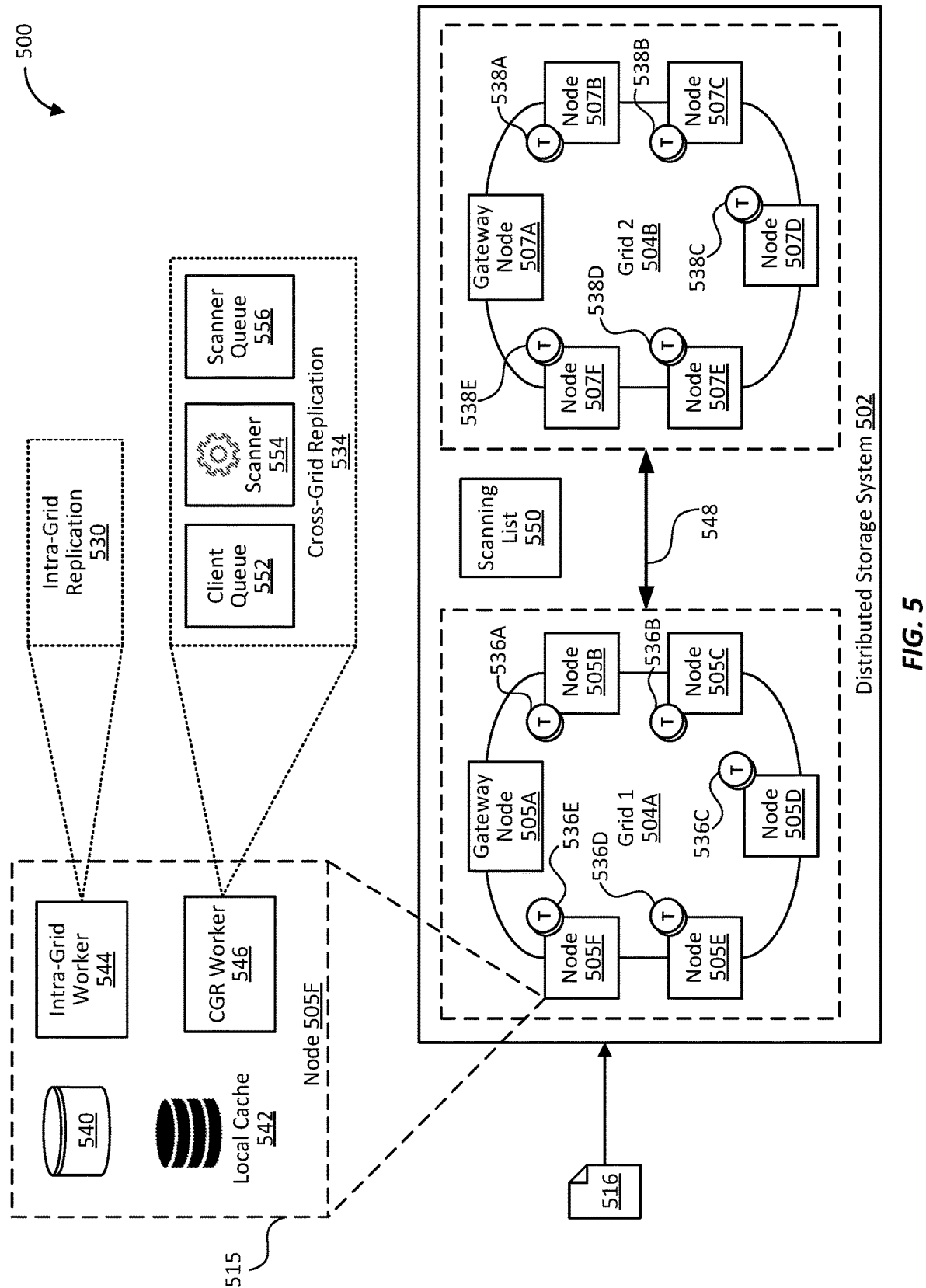
FIG. 5 illustrates an example operational system for performing cross-grid replication, according to an embodiment herein.

Turning now to FIG. 5, an example operational system 500 for performing cross-grid replication is illustrated, according to an embodiment herein. In particular, the system 500 illustrates the cross-grid replication process at a node level within a distributed storage system 502. As shown, the distributed storage system 502, which may be the same or similar to the distributed storage system 202, includes two storage grids 504A and 504B, which may be the same or similar to the storage grids 204A and 204B, respectively.

As described above, each of the storage grids 504A and 504B may include multiple nodes having a variety of functions. For example, the storage grid 504A may include a gateway node 505A and storage nodes 505B-F, and the storage grid 504B may include a gateway node 507A and storage nodes 507B-F. While the discussion herein only includes the storage grids 504A and 504B including a gateway node and storage nodes, it should be appreciated that the storage grids 504A and 504B may include other types of nodes, such as metadata nodes, computational nodes, and coordination nodes. Additionally, while each of the storage grids 504A and 504B are illustrated as only including a single gateway node and five storage nodes, the storage grids 504A and 504B may include any number of gateway nodes and storage nodes. The limited number of nodes illustrated in the Figures are for ease of explanation.

Each of the storage nodes 505B-F and 507B-F may include various components for performing intra-grid replication and/or cross-grid replication. As illustrated by blowout view 515, the storage node 505F may include storage medium 540, a local cache 542, an intra-grid worker 544, and a cross-grid replication (CGR) worker 546. When an object is received by the distributed storage system 502, ingressed by the gateway node 505A, and directed to the storage node 505F for ingest, the storage node 505F may use one or more of these components to perform its functions for various ingestion and replication processes.

For example, when storage node 505F ingests an object 516, the storage node 505F may store the object 516 in the storage medium 540. As part of the ingest process, the storage node 505F may process and validate the data associated with the object 516. Additionally, the storage node 505F may prepare the object 516, along with its associated metadata, for storage in the storage medium 540. Accordingly, the storage medium 540 may be a local storage medium in which the storage node 505F stores objects, along with an object's associated metadata, as it is ingested. In an example, the storage medium 540 may include high-capacity hard disk drives (HDDs) or solid-state drives (SSDs). In other words, the storage medium 540 provides the physical storage space where object data, such as data associated with the object 516, is persistently stored, along with associated metadata. As those skilled in the art readily appreciate, the use of HDDs or SSDs allows for efficient and reliable data retrieval, with HDDs offering cost-effective high-capacity storage and SSDs providing faster access times, catering to the specific performance and capacity requirements of the distributed storage system 502.

As part of the ingest process, the storage node 505F may also intra-grid replicate the object 516 to one or more storage nodes 505B-505E within the storage grid 504A. To perform the intra-grid replication process, the storage node 505F may include the intra-grid worker 544. The intra-grid worker 544 may be an agent or component of the storage node 505F including software code or instructions for performing intra-grid replication 530 of ingested objects, such as the object 516. As part of the intra-grid replication 530, the intra-grid worker 544 generates duplicate copies (e.g., replicates) of the object 516 and identifies one or more storage nodes 505B-E for distribution of the replicates. The intra-grid replication 530 may occur simultaneously or sequentially with the local storage of the object 516 by the storage node 505F, depending on the architecture of the distributed storage system 502 and predefined strategies. The worker 544 may receive acknowledgments from the recipient storage nodes 505B-E confirming the successful replication of the object copies. Simultaneously, the metadata associated with the object 514 is updated to reflect its replication status and the location of the replicated copies.

The worker 544 may also communicate the completion of the intra-grid replication 530 to a coordinating component, providing a confirmation or acknowledgment. This communication ensures that the object 514 is not only stored locally on the storage node 505F but has been successfully replicated across one or more storage nodes 505B-E within the storage grid 504A. As noted above, the intra-grid replication 530 enhances data availability, fault tolerance, and resilience within the distributed storage system 502, safeguarding against potential node failures or other issues that may impact data accessibility.

The storage node 505F may also include the CGR worker 546 for performing cross-grid replication 534 of the object 516. The CGR worker may be an agent or component including software code or instructions for performing cross-grid replication 534 of the object 516. As described above, cross-grid replication 534 includes replicating the object 516 to another storage grid, such as the storage grid 504B. Although the storage grids 504A and 504B are illustrated as part of the same distributed storage system 502, in some cases, the storage grids 504A and 504B may be in separate distributed storage systems, such as is illustrated in FIG. 1.

Additionally, in some cases, the storage grids 504A and 504B may be co-located at the same physical location or distributed across different geographical locations. In the former scenario, multiple independent storage grids 504A and 504B may operate within the same data center or facility, ensuring localized data management. Alternatively, in a distributed setup, storage grids 504A and 504B may be strategically located at different physical locations, providing benefits such as geographical redundancy, disaster recovery capabilities, and improved data access for users distributed across various regions. The choice between co-locating or geographically dispersing the storage grids 504A and 504B depends on factors like performance requirements, data resilience needs, and the specific objectives of the distributed storage system 502.

Figure 6:
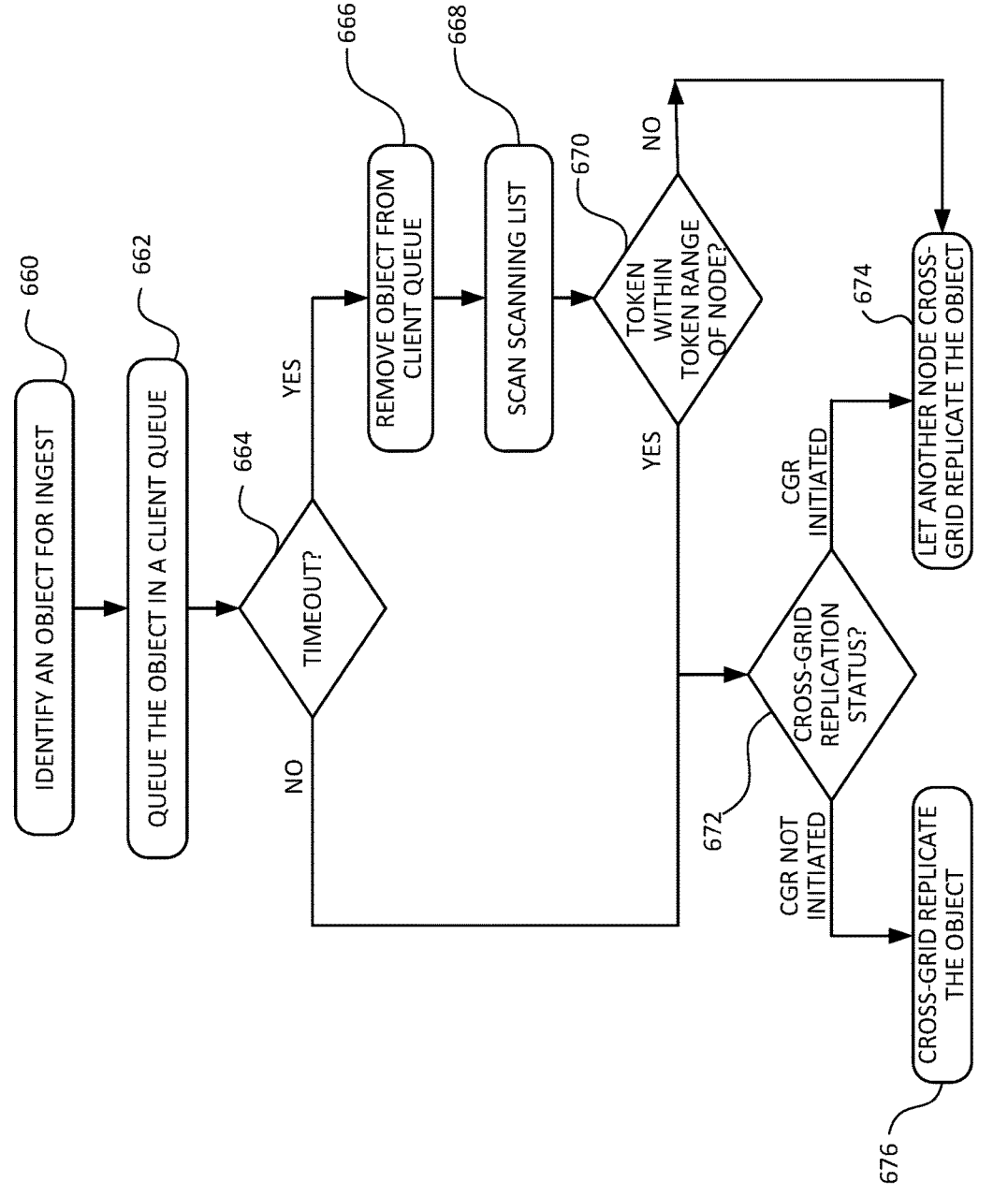
FIG. 6 illustrates an example cross-grid replication process, according to an embodiment herein.

For ease of explanation, the remaining discussion of FIG. 5 is made with reference to FIG. 6. FIG. 6 illustrates an example cross-grid replication process 600, according to an embodiment herein. While the process 600 is described with respect to FIG. 5, it should be appreciated that it is equally applicable to other systems and components provided herein. Additionally, while the process 600 illustrates steps 660-676, the process 600 is not limited to these steps and may include additional steps or may lack one or more of these steps. That is, the steps 660-676 are provided to illustrate the cross-grid replication process, not limit it to these steps.

As described above, the process 600 may start with identifying the object 516 for ingest (660) by the storage node 505F. As part of the ingest process, the CGR worker 546 may add the object 516 to a client queue 552 (662). That is, simultaneously or sequentially to the intra-grid worker 544 receiving the object 516 for ingest and/or performing the intra-grid replication 530, the CGR worker 546 may place the object 516 on the client queue 552. The client queue 552 may be a queue of objects for the storage node 505F to cross-grid replicate 534. That is, the CGR worker 546 may cross-grid replicate 534 objects that are on the client queue 552.

As can be appreciated, however, there may be a high number of objects in the client queue 552 for cross-grid replication or an object on the client queue 552 may be large, thus tying up the storage node's 505F resources. To ensure that cross-grid replication is performed efficiently and swiftly, there may be a time limit for which an object, such as the object 516, can stay in the client queue 552. For example, the time limit may be 1 minute, 5 minutes, 10 minutes, or the like. When the time limit is met, the object 516 may timeout (664) and be removed from the client queue (666). In other words, the CGR worker 546 may monitor the time duration that the object 516 is on the client queue 552 and determine that a timeout has occurred (664) and remove the object 516 from the client queue 552 (666) based on the timeout.

When the object 516 is removed from the client queue 552, the object 516 may be placed on a scanning list 550. The scanning list 550 may be hosted by the distributed storage system 502 or each storage grid 504A and 504B may host their own respective scanning list 550. The scanning list 550 may include objects that have not yet been cross-grid replicated. In other words, the scanning list 550 may include objects that have been removed from the client queues 552 of the storage nodes 505B-F and/or the storage nodes 507B-F. In an example, the scanning list 550 may be a table hosted by a database management system, such as Apache Cassandra.

In some embodiments, the object 516 may be added to the scanning list 550 adjacently or simultaneously to being added to the client queue 552. In such a case, the object 516 may be added to the scanning list 550 prior to the determination of whether a timeout has occurred or not. Because the client queue 552 may be an in-memory data, adding the object 516 to the scanning list 550 simultaneously can serve as a failsafe since the scanning list 550 may be persisted in a durable form. For example, if a respective ingest node experiences a fault, the client queue 552 may be lost, thus adding the object 516 to the scanning list 550 in parallel to the client queue 552 can ensure that the object 516 is replicated and not lost in the fault.

To prevent multiple storage nodes 505B-F from cross-grid replicating 534 the object 516, each of the storage nodes 505B-F may include a scanner 554. The scanner 554 may scan the scanning list 550 to identify objects 516 that a respective node is responsible for cross-grid replicating. For example, the storage node 505F includes the scanner 554 that scans the scanning list 550 for the object 516 that it is responsible for cross-grid replicating.

As noted above, the storage node 505F may determine the CGR status of the object 516 before cross-grid replicating the object 516. This determination includes checking to make sure whether or not other storage nodes 505B-E have already initiated the cross-grid replication process. In other words, checking the CGR status of the object 516 ensures that only a single duplicate copy of the object 516 is cross-grid replicated.

Cross-grid replication of the object 516, when performed multiple times or by multiple storage nodes 505B-F, can introduce several challenges, with race conditions being a prominent concern. In scenarios where the same object 516 is replicated across the storage grids 504A and 504B simultaneously, conflicts may arise due to the asynchronous nature of replication processes. Race conditions occur when conflicting updates or changes are made to the object 516 during the replication process, leading to inconsistencies in replicated copies. This can result in a lack of synchronization among the storage grids 504A and 504B, compromising data integrity. Additionally, the potential for increased network traffic and resource utilization arises as multiple replication processes contend for bandwidth and processing resources. As such, the cross-grid replication process 600 and the CGR worker 546 provided herein, provide an enhanced cross-grid replication process that manages conflicts, ensures consistency, minimizes the impact of race conditions, and ultimately maintains a coherent and reliable distributed storage system 502.

To prevent multiple storage nodes 505B-F from performing the cross-grid replication process on the same object 516, each storage nodes 505B-F may be assigned a token range 536A-E. For example, the node 505B may be assigned the token range 536A, the node 505C may be assigned the token range 536B, the node 505D may be assigned the token range 536C, the node 505E may be assigned the token range 536D, and the node 505F may be assigned the token range 536E. The token ranges 536A-E may be assigned to each of the storage nodes 505B-F via a sharding process. As those skilled in the art readily appreciate, a sharding process may entail the systematic assignment of token ranges 536A-E to individual storage nodes 505B-F, serving as a fundamental mechanism for data partitioning and responsibility distribution. Sharding is particularly crucial in systems like Apache Cassandra to enable horizontal scalability and efficient data retrieval.

During the sharding process, the distributed storage system 502 employs a consistent hashing algorithm to generate tokens representing ranges of data. As such, upon ingest of the object 516, the object 516 may be assigned a token. These tokens are then mapped to the storage nodes 505B-F in the distributed storage system 502 as the assigned token ranges 536A-E to ensure that each node is responsible for specific token ranges. This approach not only distributes the cross-grid replication responsibility evenly across the nodes 505B-F but also facilitates a balanced and scalable architecture. The sharding process enhances fault tolerance and parallelizes data operations, as each storage node 505B-F is independently responsible for its assigned token range, contributing to the overall efficiency and performance of the distributed storage system 502. As illustrated, each of the storage nodes 507B-F in the storage grid 504B may similarly be assigned a respective token range 538A-E.

Returning now to the scanner 554, the scanner 554 may scan the scanning list 550 (668) to identify objects 516 that have a token within the token range 536A of the storage node 505F (670). If the scanner 554 identifies the object 516 as having a token within the token range 536E of the storage node 505F, then the CGR worker 546 may move the object 516 from the scanning list 550 to the scanning queue 556. The scanning queue 556 may be a queue or list of all the objects 516 that the storage node 505F is responsible for cross-grid replicating.

Once on the scanning queue 556, the CGR worker 546 may determine the CGR status (672) of the object 516 prior to initiating the cross-grid replication of the object 516. This determination may be made once the object 516 reaches the top of the scanning queue 556 or as the object 516 approaches the top of the scanning queue 556. The top of the scanning queue 556, as used herein, may refer to the object's 516 position in the scanning queue 556 indicating that it is the object's 516 turn to be cross-grid replicated.

To determine the CGR status of the object 516, the storage node 505F may check its local cache 542 to determine whether cross-grid replication of the object 516 was already initiated. As can be appreciated, there may be scenarios where the storage node 505F initiated cross-grid replication of the object 516 while the object 516 was on the client queue 552. However, due to the size of the object 516 or the timing of when the cross-grid replication process was initiated, the object 516 may have timed-out of the client queue 552 and been removed to the scanning list 550. Thus, the storage node 505F may have initiated the cross-grid replication process and such process may be underway or even completed by the time the object 516 is moved to the scanner queue. As such, checking the CGR status of the object 516 prior to initiating the cross-grid replication based on the object 516 being in the scanner queue 556 ensures that the object 516 is not cross-grid replicated twice.

In embodiments, the storage node 505F may check with (e.g., send a query to) the other storage nodes 505B-E, specifically requesting the nodes check their local caches, to confirm that cross-grid replication of the object 516 has not yet been initiated. For example, if the object 516 was ingested by the storage node 505B, then the storage node 505B may have placed the object 516 on its client queue 552. While on the client queue 552, the storage node 505B may have initiated the cross-grid replication of the object 516. However, due to the object's 516 size or the timing of the cross-grid replication process, the object 516 may have timed-out and been removed to the scanning list 550. In this example, the object 516 may have a token that is within the token range 536E of the storage node 505F, not the token range 536A of the storage node 505B. As such, the storage node 505F may identify the object 516 as within its token range 536E and move it to its scanner queue 556. By checking with the other storage nodes 505B-E, in particular the storage node 505B, the storage node 505F can determine that the storage node 505B already initiated (or even completed) the cross-grid replication of the object 516 and let the storage node 505B replicate the object 516 (674). In other words, the storage node 505F, upon determining that cross-grid replication of the object 516 has already been initiated by another storage node, can refrain from cross-grid replicating the object 516 and remove the object 516 from the scanner queue 556.

In the alternative, if the storage node 505F determines that cross-grid replication of the object 516 has not been initiated by any other storage nodes 505B-E or itself, then the storage node 505F can proceed with cross-grid replication the object 516 (676), as described above. For example, the storage node 505F may establish a client connection 548 with the gateway node 507A of the storage grid 504B and transmit a request that the object 516 is cross-grid replicated to the storage grid 504B.

Figure 7:
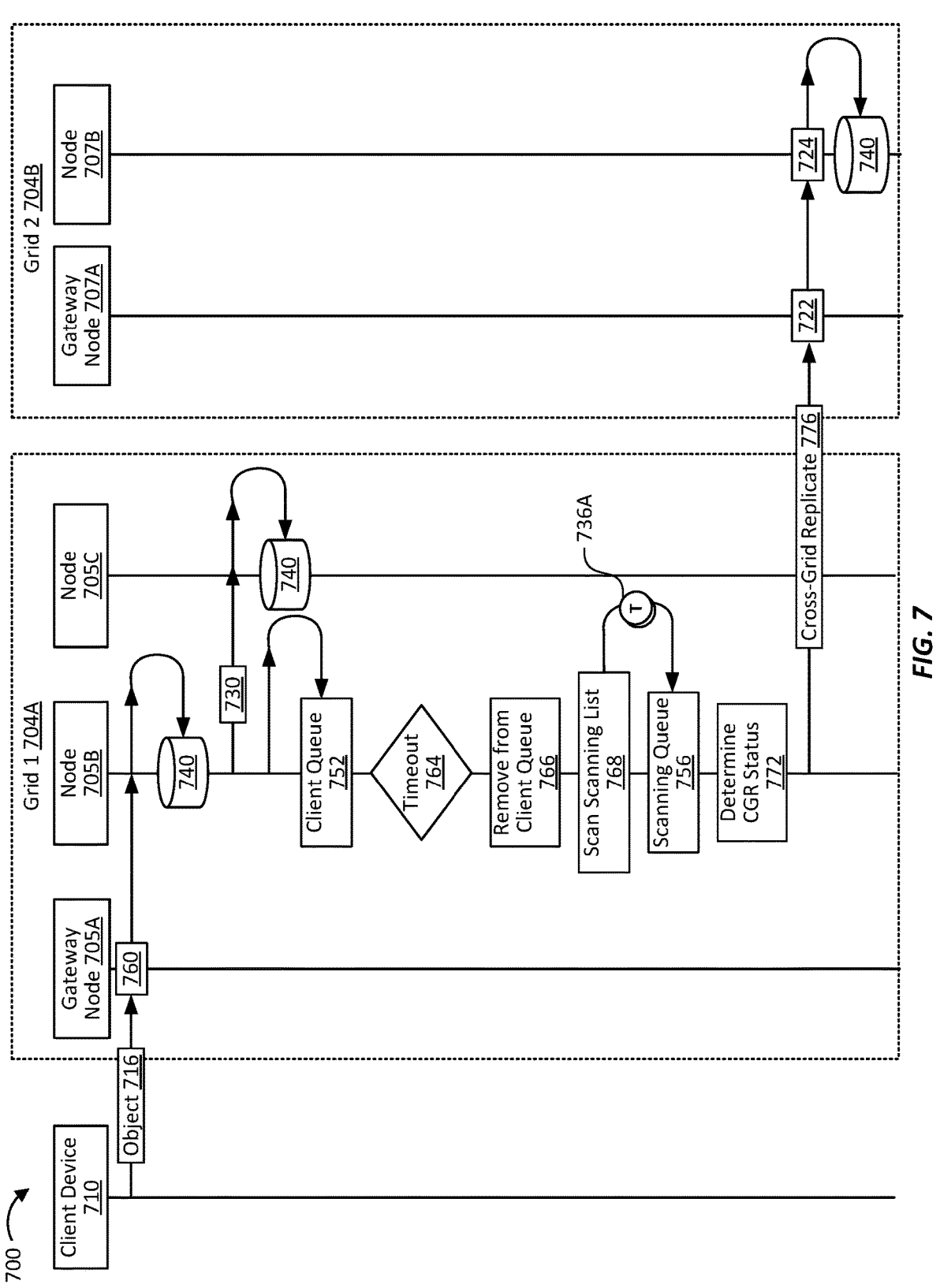
FIG. 7 illustrates an example flow of a cross-grid replication process, according to an embodiment herein.

Turning now to FIG. 7, an example flow 700 of a cross-grid replication process is illustrated, according to an embodiment herein. As shown, a client device 710, which may be the same or similar to the client device 110 may submit a request to save, edit, or otherwise modify an object 716, which may be the same or similar to the object 516. In particular, the client device 710 may submit the request to the storage grid 704A via a distributed storage system (not shown). As described above, the client device 710 may submit its request to the distributed storage system, such as the distributed storage system 502, via an API, such as the storage application 112, which in some cases, coordinates with the business application 108 executing on the client device 710.

In the illustrated example, the distributed storage system includes two storage grids 704A and 704B, which may be the same or similar to the storage grids 504A and 504B, respectively. As such, each of the storage grids 704A and 704B may include multiple nodes, such as the storage grid 704A including a gateway node 705A and storage nodes 705B and 705C. Similarly, the storage grid 704B may include a gateway node 707A and a storage node 707B. As shown, the request from the client device 710, including the object 716 associated with the request is received by the storage grid 704A. In particular, the gateway node 705A of the storage grid 704A receives the object 716 and its associated request.

When the gateway node 705A receives the object 716, a respective storage node, such as the storage node 705B, within the storage grid 704A may identify the object 716 for ingest (760). As described above, the storage node that is assigned to ingest the object 716 may be determined by the gateway node 705A based on a variety of factors. When the storage node 705B is identified as the ingest node for the object 716, the gateway node 705A directs the object 716 to the storage node 705B. Upon receipt of the object 716, the storage node 705B may locally store the object 716 (depending on the request associated with the object 716) in a respective storage medium 740. The storage medium 740 may be the same or similar to the storage medium 540.

At the same time or shortly after the storage node 705B stores the object 716 in the storage medium 740, the storage node 705B may perform one or more intra-grid replication processes (730). In particular, an intra-grid worker, such as the intra-grid worker 544, of the storage node 705B may replicate the object 716 to one or more storage nodes 705C in the storage grid 704A. As illustrated, the storage node 705B may intra-grid replicate the object 716 (730) to the storage node 705C. Upon receipt of the replicated object 716, the storage node 705C may store the replicated object 716 on its respective storage medium 740.

As part of the ingest process, the storage node 705B may also add the object 716 to its client queue 752, which may be the same or similar to the client queue 552. In particular, a CGR worker may add the object 716 to the client queue 752 at the same time that the intra-grid worker performs the intra-grid replication (730) of the object 716. In some cases, the client device 710 may receive a "success" response from the storage grid 705B after the object 716 is added to the client queue 752 (not shown). At a subsequent point, the storage node 705B may determine that timeout 764 has occurred for the object 716. As described above, the timeout 764 may indicate that the amount of time that the object 716 has been on the client queue 752 has reached a time limit and therefore it is time to remove the object 716 from the client queue 752. Once the timeout 764 is determined, the CGR worker of the storage node 705B may remove the object 716 from the client queue 752 (766).

As described above, when the object 716 is removed from the client queue 752, the object 716 may be added to a scanning list of the storage grid 704A, such as the scanning list 550. As noted above, in some cases the object 716 may be added to the scanning list adjacent to being added to the client queue 752. Once on the scanning list 550, scanners for each respective storage node 705B-C may scan the scanning list 550 (768) to determine if any objects having tokens within a respective token range are on the list. In other words, the storage node 705B scans the scanning list to identify object's having tokens that fall within a token range 736A of the storage node 705B. If the storage node 705B identifies the object 716 (or any other objects) having tokens within the token range 736A, the storage node 705B adds the object 716 to its scanning queue (756).

Once on the scanning queue, the object 716 is identified by the storage node 705B for cross-grid replication. However, to prevent multiple storage nodes 705B-C on the storage grid 704A from cross-grid replicating the same object 716, the storage node 705B may first determine a cross-grid replication (CGR) status 772 of the object 716 before performing cross-grid replication. As described above, determining the CGR status 772 of the object 716 may include checking its own local cache (e.g., 542) or checking with the other storage nodes 705C on the storage grid 704A to confirm that they have not initiated cross-grid replication of the object 716. If the storage node 705B determines that cross-grid replication of the object 716 has already been initiated, either by itself or by another storage node 705C within the storage grid 704A, the storage node 705B may remove the object 716 from the scanning queue 756 and refrain from cross-grid replicating the object 716 again.

If the storage node 705B, however, determines that cross-grid replication of the object 716 has not yet been initiated, then the storage node 705B may initiate cross-grid replication of the object 716 (776). As part of the cross-grid replication process, the storage node 705B may establish a client connection with the gateway node 707A. Once the client connection is established between the storage node 705B and the gateway node 707A, the storage node 705B initiates cross-grid replication (776) of the object 716 to the gateway node 707A. The gateway node 707A may process the cross-grid replication (722) request received from the storage node 705B and direct the cross-grid replication (722) request to the storage node 707B (724). Responsive to receiving the cross-grid replication (722) request, the storage node 707B may replicate and store the replicated object in its respective local storage medium 740.

Figure 8:
FIG. 8 illustrates an example distributed storage system having multiple dispersed storage grids, according to an embodiment herein.

Turning now to FIG. 8, an example distributed storage system 802 having multiple dispersed storage grids is illustrated, according to an embodiment herein. As shown, the distributed storage system 802 includes multiple storage grids 804A and 804B, which may be the same or similar to the storage grids 504A and 504B. Each of the storage grids 804A and 804B may be dispersed across two or more sites. For example, the storage grid 804A is dispersed across a site 803A and a site 803B and the storage grid 804B is dispersed across a site 803C and a site 803D. Each of the sites 803A-D may be physically remote from one another. In some cases, however, one or more of the sites 803A-803D may be co-located with respect to one another, such as in the same location or data center.

As shown, each of the storage grids 804A and 804B may include multiple nodes, having various functions. For example, the storage grid 804A includes a gateway node 805A and storage nodes 805B-F at site 803A and a gateway node 809A and storage nodes 809B-F at site 803B. Similarly, the storage grid 804B includes a gateway node 807A and storage nodes 807B-F at site 803C and a gateway node 811A and storage nodes 811B-F at site 803D.

The distributed storage system 802 may include systems and processes for performing one or more functions of the cross-grid replication process described herein. For example, when an object 816 is received by the distributed storage system 802, the object 816 is received by the gateway 805A and directed (818) to the storage node 805C for ingest. As part of the ingest process, the storage node 805C performs intra-grid replication (820) of the object 816 to one or more storage nodes within the storage grid 804A. In the illustrated example, the storage node 805C intra-grid replicates (820) the object 816 to another storage node 805E at the site 803A and intra-grid replicates (820) the object 816 to the storage node 809B at the site 803B. Since the sites 803A and 803B are remote from one another, having replicated copies of the object 816 across the two sites enhances the data reliance of the object 816, disaster recovery capabilities, and provides improved access to the object 816 for users distributed across various regions.

In addition to intra-grid replicating (820) the object 816, the storage grid 805C may also cross-grid replicate (822) the object, as described above. When cross-grid replicating (822) the object 816, the storage node 805C may establish a client connection with the gateway node 811A of the storage grid 804B and initiate the cross-grid replication (822) process. As described above, the gateway node 811A may direct the replication request (824) to a respective storage node 811E, which in turn replicates and stores the replicated object 816.

Referring now to FIG. 9, is a diagram of a system 900 configured to implement one or more steps of a cross-grid replication process described herein, according to an embodiment. The system 900 may be an example of an apparatus including a computing apparatus 990 that is representative of any system or collection of systems in which the various processes, systems, programs, services, and scenarios disclosed herein may be implemented. For example, computing apparatus 990 may be an example node, such as the storage node 205B, or may be a client device, such as the client device 110, or any of the subcomponents depicted in systems 100 or 202 of FIGS. 1 and 2, respectively. Examples of computing apparatus 990 include, but are not limited to, server computers, desktop computers, laptop computers, routers, switches, web servers, cloud computing platforms, and data center equipment, as well as any other type of physical or virtual server machine, physical or virtual router, container, and any variation or combination thereof.

Computing apparatus 990 may be implemented as a single apparatus, system, or device or may be implemented in a distributed manner as multiple apparatuses, systems, or devices. Computing apparatus 990 may include, but is not limited to, processing system 998, storage system 992, software 994, communication interface system 997, and user interface system 999. Processing system 998 may be operatively coupled with storage system 992, communication interface system 997, and user interface system 999.

Processing system 998 may load and execute software 994 from storage system 992. Software 994 may include cross-grid replication (CGR) process 996, which may be representative of one or more steps of the cross-grid replication process or intra-grid replication process, as discussed with respect to the preceding figures. When executed by processing system 998, software 994 may direct processing system 998 to operate as described herein for at least the various processes, such as the processes 300 and 600, operational scenarios, and sequences discussed in the foregoing implementations. Computing apparatus 990 may optionally include additional devices, features, or functionality not discussed for purposes of brevity.

In some embodiments, processing system 998 may comprise a micro-processor and other circuitry that retrieves and executes software 994 from storage system 992. Processing system 998 may be implemented within a single processing device but may also be distributed across multiple processing devices or sub-systems that cooperate in executing program instructions. Examples of processing system 998 may include general purpose central processing units, graphical processing units, application specific processors, and logic devices, as well as any other type of processing device, combinations, or variations thereof.

Storage system 992 may comprise any memory device or computer readable storage media readable by processing system 998 and capable of storing software 994. Storage system 992 may include volatile and nonvolatile, removable and non-removable media implemented in any method or technology for storage of information, such as computer readable instructions, data structures, program modules, or other data. Examples of storage media include random access memory, read only memory, magnetic disks, optical disks, optical media, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 992 may also include computer readable communication media over which at least some of software 994 may be communicated internally or externally. Storage system 992 may be implemented as a single storage device but may also be implemented across multiple storage devices or sub-systems co-located or distributed relative to each other. Storage system 992 may comprise additional elements, such as a controller, capable of communicating with processing system 998 or possibly other systems.

Software 994 (including cross-grid replication process 996 among other functions) may be implemented in program instructions that may, when executed by processing system 998, direct processing system 998 to operate as described with respect to the various operational scenarios, sequences, and processes illustrated herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 994 may include additional processes, programs, or components, such as operating system software, virtualization software, or other application software. Software 994 may also comprise firmware or some other form of machine-readable processing instructions executable by processing system 998.

In general, software 994 may, when loaded into processing system 998 and executed, transform a suitable apparatus, system, or device (of which computing apparatus 990 is representative) overall from a general-purpose computing system into a special-purpose computing system as described herein. Indeed, encoding software 994 on storage system 992 may transform the physical structure of storage system 992. The specific transformation of the physical structure may depend on various factors in different implementations of this description. Examples of such factors may include, but are not limited to, the technology used to implement the storage media of storage system 992 and whether the computer-storage media are characterized as primary or secondary storage, as well as other factors.

For example, if the computer readable storage media are implemented as semiconductor-based memory, software 994 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 997 may include communication connections and devices that allow for communication with other computing systems (not shown) over communication networks (not shown). Examples of connections and devices that together allow for inter-system communication may include network interface cards, antennas, power amplifiers, radio-frequency (RF) circuitry, transceivers, and other communication circuitry. The connections and devices may communicate over communication media to exchange communications with other computing systems or networks of systems, such as metal, glass, air, or any other suitable communication media.

Communication between the computing apparatus 990 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, which may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

As will be appreciated by one skilled in the art, aspects of the present invention may be embodied as a system, method, computer program product, and other configurable systems. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more memory devices or computer-readable storage medium(s) having computer readable program code embodied thereon.

The foregoing examples and descriptions are described herein in the context of systems and methods for performing cross-grid replication within a distributed storage system. Those of ordinary skill in the art will realize that these descriptions are illustrative only and are not intended to be in any way limiting. Reference is made in detail to implementations of examples as illustrated in the accompanying drawings. The same reference indicators are used throughout the drawings and the description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. That is, the foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in an embodiment," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all the following interpretations of the word: any of the items in the list, all the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

As used below, any reference to a series of examples is to be understood as a reference to each of those examples disjunctively (e.g., "Examples 1-4" is to be understood as "Examples 1, 2, 3, or 4").

Example 1 is a method comprising: ingesting an object into a first storage grid comprising a first distributed storage system; replicating the object to one or more nodes within the first storage grid; determining a cross-grid replication status of the object to a second storage grid comprising a second distributed storage system; and performing a cross-grid replication of the object to the second storage grid based on the cross-grid replication status of the object.

Example 2 is the method of any previous or subsequent Example, wherein the first storage grid comprises a first set of nodes and identifying the object for ingest into the first storage grid comprises: identifying, by a first node of the first set of nodes, the object for ingest into the first storage grid; replicating, by the first node, the object to at least a second node of the first set of nodes in the first storage grid; and enqueuing, by the first node, the object into a client queue for cross-grid replication of the object to the second storage grid.

Example 3 is the method of any previous or subsequent Example, wherein the first storage grid comprises a first set of nodes and determining the cross-grid replication status of the object further comprises: enqueuing, by a first node of the first set of nodes, the object onto a scanner queue; checking, by the first node, whether the object has been cross-grid replicated by other nodes within the first set of nodes; and performing the cross-grid replication, by the first node, the object to the second storage grid.

Example 4 is the method of any previous or subsequent Example, wherein: the first storage grid comprises a first set of nodes, and the second storage grid comprises a second set of nodes; determining the cross-grid replication status of the object further comprises: enqueuing, by a first node of the first set of nodes, the object on a client queue for cross-grid replication; and checking, by the first node, whether the object has been cross-grid replicated by other nodes within the first set of nodes based on the object's position the client queue; and performing the cross-grid replication the object to the second storage grid comprises: performing the cross-grid replication, by the first node, the object to a second node of the second set of nodes on the second storage grid.

Example 5 is the method of any previous or subsequent Example, wherein the first storage grid comprises a first set of nodes and the method further comprises: enqueuing, by a first node of the first set of nodes, the object onto a client queue; removing, by the first node, the object from the client queue based on a timeout, wherein the timeout is based on at time duration that the object is in the client queue; scanning, by the first node, a scanning list comprising objects for cross-grid replication, wherein the object is on the scanning list after removal from the client queue; and enqueuing, by the first node, the object onto a scanning queue.

Example 6 is the method of any previous or subsequent Example, wherein the first storage grid comprises a first set of nodes, the second storage grid comprises a second set of nodes, and the method further comprises: scanning, by a first node of the first set of nodes, a scanning list comprising objects for cross-grid replication based on a token range associated with the first node, wherein the object is on the scanning list and each node within the first set of nodes is assigned a respective token range; determining, by the first node, the object for cross-grid replication based on a token associated with the object being within the token range of the first node; and performing the cross-grid replication, by the first node, the object to a second node of the second set of nodes on the second storage grid.

Example 7 is the method of any previous or subsequent Example, wherein performing the cross-grid replication the object to the second storage grid comprises: establishing a client connection between a first node of the first storage grid and a gateway to the second storage grid; and performing the cross-grid replication of the object to the second storage grid via the client connection.

Example 8 is a computing apparatus comprising: a computer-readable storage medium; processor-executable instructions stored on the computer-readable storage medium; and one or more processors coupled to the computer-readable storage medium and configured to execute the processor-executable instructions, wherein the processor-executable instructions, when executed by the one or more processors, direct the computing apparatus, to at least: identify an object for ingest into a first distributed storage system comprising a first plurality of nodes distributed across multiple sites and accessible via a first namespace; replicate the object to one or more nodes within the first distributed storage system; determine a cross-grid replication status of the object to a second distributed storage system comprising a second plurality of nodes distributed across multiple sites and accessible via a second namespace; and perform a cross-grid replication of the object to the second distributed storage system based on the cross-grid replication status of the object.

Example 9 is the computing apparatus of any previous or subsequent Example, wherein the processor-executable instructions to identify the object for ingest into the first distributed storage system, when executed by the one or more processors, further direct the computing apparatus to: identify, by a first node of the first plurality of nodes, the object for ingest into the first distributed storage system; replicate, by the first node, the object to at least a second node of the first plurality of nodes in the first distributed storage system; and cross-grid replicate the object to a third node of the second plurality of nodes on the second distributed storage system.

Example 10 is the computing apparatus of any previous or subsequent Example, wherein the processor-executable instructions to determine the cross-grid replication status of the object, when executed by the one or more processors, further direct the computing apparatus to: enqueue, by a first node of the first plurality of nodes, the object on a client queue for cross-grid replication; and remove, by the first node, the object from the client queue based on a timeout, wherein the timeout is based on a time duration that the object is in the client queue; and enqueue, by the first node of the first plurality of nodes, the object onto a scanning queue based on a token range associated with the first node, wherein: each node within the first plurality of nodes is assigned a respective token range; and the object comprises a token within the token range of the first node.

Example 11 is the computing apparatus of any previous or subsequent Example, wherein: the processor-executable instructions to determine the cross-grid replication status of the object, when executed by the one or more processors, further direct the computing apparatus to: enqueue, by a first node of the first plurality of nodes, the object onto a scanner queue; and check, by the first node, whether the object has been cross-grid replicated by any other node within the first plurality of nodes; and the processor-executable instructions to cross-grid replicate the object to the second distributed storage system, when executed by the one or more processors, further direct the computing apparatus to: cross-grid replicate, by the first node, the object to a second node of the second plurality of nodes on the second distributed storage system.

Example 12 is the computing apparatus of any previous or subsequent Example, wherein the processor-executable instructions, when executed by the one or more processors, further direct the computing apparatus to: scan, by a first node of the first plurality of nodes, a scanning list comprising objects for cross-grid replication, wherein the object is on the scanning list; and check, by the first node, whether the object has been cross-grid replicated by other nodes within the first plurality of nodes.

Example 13 is the computing apparatus of any previous or subsequent Example, wherein the processor-executable instructions, when executed by the one or more processors, further direct the computing apparatus to: scan, by a first node of the first plurality of nodes, a scanning list comprising objects for cross-grid replication based on a token range associated with the first node, wherein the object is on the scanning list and each node within the first plurality of nodes is assigned a respective token range; determine, by the first node, the object for cross-grid replication based on a token associated with the object being within the token range of the first node; and enqueue, by the first node, the object onto a scanning queue for cross-grid replication to the second distributed storage system.

Example 14 is the computing apparatus of any previous or subsequent Example, wherein the processor-executable instructions to cross-grid replicate the object to the second distributed storage system, when executed by the one or more processors, further direct the computing apparatus to: cross-grid replicate the object to the second distributed storage system via a client connection between a first node in the first distributed storage system and a gateway in the second distributed storage system.

Example 15 is a computer-readable storage medium comprising processor-executable instructions configured to cause one or more processors to: identify an object for ingest into a first storage grid within a distributed storage system, wherein: the distributed storage system comprises the first storage grid and a second storage grid; and the first storage grid and the second storage grid are independent of one another; replicate the object to one or more nodes within the first storage grid; and cross-grid replicate the object from the first storage grid to the second storage grid.

Example 16 is the computer-readable storage medium of any previous or subsequent Example, wherein the first storage grid comprises a first set of nodes, the second storage grid comprises a second set of nodes, and the processor-executable instructions to identify the object for ingest into the first storage grid cause the one or more processors to further execute processor-executable instructions stored in the computer-readable storage medium to: identify, by a first node of the first set of nodes, the object for ingest into the first storage grid; replicate, by the first node, the object to at least a second node of the first set of nodes and a third node of the first set of nodes in the first storage grid; and cross-grid replicate the object to a fourth node of the second set of nodes on the second storage grid.

Example 17 is the computer-readable storage medium of any previous or subsequent Example, wherein the first storage grid comprises a first set of nodes and the processor-executable instructions cause the one or more processors to further execute processor-executable instructions stored in the computer-readable storage medium to: enqueue, by a first node of the first set of nodes, the object on a client queue for cross-grid replication; remove, by the first node, the object from the client queue based on a timeout, wherein the timeout is based on a time duration that the object is in the client queue; and enqueue, by the first node, the object onto a scanner queue.

Example 18 is the computer-readable storage medium of any previous or subsequent Example, wherein the first storage grid comprises a first set of nodes and the processor-executable instructions cause the one or more processors to further execute processor-executable instructions stored in the computer-readable storage medium to: scan, by a first node of the first set of nodes, a scanning list comprising objects for cross-grid replication, wherein the object is on the scanning list; and check, by the first node, whether the object has been cross-grid replicated by other nodes within the first set of nodes; determine, by the first node, that a second node of the first set of nodes has initiated cross-grid replication of the object; and remove, by the first node, the object from the scanning list based on the second node initiating cross-grid replication of the object.

Example 19 is the computer-readable storage medium of any previous or subsequent Example, wherein the first storage grid comprises a first set of nodes, the second storage grid comprises a second set of nodes, and the processor-executable instructions stored in the computer-readable storage medium are further configured to cause the one or more processors to: enqueue, by a first node of the first set of nodes, the object onto a scanning queue based on a token range associated with the first node, wherein: each node within the first set of nodes is assigned a respective token range; and the object comprises a token within the token range of the first node; and cross-grid replicate, by the first node, the object to a second node of the second set of nodes on the second storage grid.

Example 20 is the computer-readable storage medium of any previous or subsequent Example, wherein the first storage grid comprises a first set of nodes, the second storage grid comprises a second set of nodes, and the processor-executable instructions to cross-grid replicate the object to the second storage grid cause the one or more processors to further execute processor-executable instructions stored in the computer-readable storage medium to: cross-grid replicate, by a first node of the first set of nodes, the object to a second node of the second set of nodes on the second storage grid via a client connection between the first node of the first storage grid and a gateway node of the second storage grid.

What is claimed is:

1. A method comprising:
ingesting an object into a first storage grid comprising a first distributed storage system;
replicating the object to one or more nodes within the first storage grid;
determining a cross-grid replication status of the object to a second storage grid comprising a second distributed storage system; and
performing a cross-grid replication of the object to the second storage grid based on the cross-grid replication status of the object, wherein performing the cross-grid replication the object to the second storage grid comprises:
establishing a client connection between a first node of the first storage grid and a gateway to the second storage grid; and
performing the cross-grid replication of the object to the second storage grid via the client connection.

2. The method of claim 1, wherein the first storage grid comprises a first set of nodes and identifying the object for ingest into the first storage grid comprises:
identifying, by a first node of the first set of nodes, the object for ingest into the first storage grid;
replicating, by the first node, the object to at least a second node of the first set of nodes in the first storage grid; and
enqueuing, by the first node, the object into a client queue for cross-grid replication of the object to the second storage grid.

3. The method of claim 1, wherein;
the first storage grid comprises a first set of nodes;
determining the cross-grid replication status of the object further comprises:
enqueuing, by a first node of the first set of nodes, the object onto a scanner queue; and
checking, by the first node, whether the object has been cross-grid replicated by other nodes within the first set of nodes; and
performing the cross-grid replication the object to the second storage grid comprises:
performing the cross-grid replication, by the first node, the object to the second storage grid.

4. The method of claim 1, wherein:
the first storage grid comprises a first set of nodes, and the second storage grid comprises a second set of nodes;
determining the cross-grid replication status of the object further comprises:
enqueuing, by a first node of the first set of nodes, the object on a client queue for cross-grid replication; and checking, by the first node, whether the object has been cross-grid replicated by other nodes within the first set of nodes based on the object's position the client queue; and performing the cross-grid replication the object to the second storage grid comprises:

performing the cross-grid replication, by the first node, the object to a second node of the second set of nodes on the second storage grid.

5. The method of claim 1, wherein the first storage grid comprises a first set of nodes and the method further comprises:

enqueuing, by a first node of the first set of nodes, the object onto a client queue;

removing, by the first node, the object from the client queue based on a timeout, wherein the timeout is based on at time duration that the object is in the client queue;

scanning, by the first node, a scanning list comprising objects for cross-grid replication, wherein the object is on the scanning list after removal from the client queue; and enqueuing, by the first node, the object onto a scanning queue.

6. The method of claim 1, wherein:

the first storage grid comprises a first set of nodes, the second storage grid comprises a second set of nodes; the method further comprises:

scanning, by a first node of the first set of nodes, a scanning list comprising objects for cross-grid replication based on a token range associated with the first node, wherein the object is on the scanning list and each node within the first set of nodes is assigned a respective token range; and determining, by the first node, the object for cross-grid replication based on a token associated with the object being within the token range of the first node; and performing the cross-grid replication the object to the second storage grid comprises:

performing the cross-grid replication, by the first node, the object to a second node of the second set of nodes on the second storage grid.

7. A computing apparatus comprising:

a computer-readable storage medium;

processor-executable instructions stored on the computer-readable storage medium; and one or more processors coupled to the computer-readable storage medium and configured to execute the processor-executable instructions, wherein the processor-executable instructions, when executed by the one or more processors, direct the computing apparatus, to at least:

identify an object for ingest into a first distributed storage system comprising a first plurality of nodes distributed across multiple sites and accessible via a first namespace;

replicate the object to one or more nodes within the first distributed storage system;

determine a cross-grid replication status of the object to a second distributed storage system comprising a second plurality of nodes distributed across multiple sites and accessible via a second namespace; and perform a cross-grid replication of the object to the second distributed storage system based on the cross-grid replication status of the object, wherein to cross-grid replicate the object to the second distributed storage system, the processor-executable instructions, when executed by the one or more processors, further direct the computing apparatus to:

cross-grid replicate the object to the second distributed storage system via a client connection between a first node in the first distributed storage system and a gateway in the second distributed storage system.

8. The computing apparatus of claim 7, wherein the processor-executable instructions to identify the object for ingest into the first distributed storage system, when executed by the one or more processors, further direct the computing apparatus to:

identify, by a first node of the first plurality of nodes, the object for ingest into the first distributed storage system;

replicate, by the first node, the object to at least a second node of the first plurality of nodes in the first distributed storage system; and cross-grid replicate the object to a third node of the second plurality of nodes on the second distributed storage system.

9. The computing apparatus of claim 7, wherein the processor-executable instructions to determine the cross-grid replication status of the object, when executed by the one or more processors, further direct the computing apparatus to:

enqueue, by a first node of the first plurality of nodes, the object on a client queue for cross-grid replication;

remove, by the first node, the object from the client queue based on a timeout, wherein the timeout is based on a time duration that the object is in the client queue; and enqueue, by the first node of the first plurality of nodes, the object onto a scanning queue based on a token range associated with the first node, wherein:

each node within the first plurality of nodes is assigned a respective token range; and the object comprises a token within the token range of the first node.

10. The computing apparatus of claim 7, wherein:

the processor-executable instructions to determine the cross-grid replication status of the object, when executed by the one or more processors, further direct the computing apparatus to:

enqueue, by a first node of the first plurality of nodes, the object onto a scanner queue; and check, by the first node, whether the object has been cross-grid replicated by any other node within the first plurality of nodes; and the processor-executable instructions to cross-grid replicate the object to the second distributed storage system, when executed by the one or more processors, further direct the computing apparatus to:

cross-grid replicate, by the first node, the object to a second node of the second plurality of nodes on the second distributed storage system.

11. The computing apparatus of claim 7, wherein the processor-executable instructions, when executed by the one or more processors, further direct the computing apparatus to:

scan, by a first node of the first plurality of nodes, a scanning list comprising objects for cross-grid replication, wherein the object is on the scanning list; and check, by the first node, whether the object has been cross-grid replicated by other nodes within the first plurality of nodes.

12. The computing apparatus of claim 7, wherein the processor-executable instructions, when executed by the one or more processors, further direct the computing apparatus to:

scan, by a first node of the first plurality of nodes, a scanning list comprising objects for cross-grid replication based on a token range associated with the first node, wherein the object is on the scanning list and each node within the first plurality of nodes is assigned a respective token range;

determine, by the first node, the object for cross-grid replication based on a token associated with the object being within the token range of the first node; and enqueue, by the first node, the object onto a scanning queue for cross-grid replication to the second distributed storage system.

13. A computer-readable storage medium comprising processor- executable instructions configured to cause one or more processors to:

identify an object for ingest into a first storage grid within a distributed storage system, wherein:

the distributed storage system comprises the first storage grid and a second storage grid; and the first storage grid and the second storage grid are independent of one another;

replicate the object to one or more nodes within the first storage grid; and cross-grid replicate the object from the first storage grid to the second storage grid, wherein to cross-grid replicate the object comprises:

establish a client connection between a first node of the first storage grid and a gateway of the second storage grid; and perform the cross-grid replication of the object to the second storage grid via the client connection.

14. The computer-readable storage medium of claim 13, wherein the first storage grid comprises a first set of nodes, the second storage grid comprises a second set of nodes, and the processor-executable instructions to identify the object for ingest into the first storage grid cause the one or more processors to further execute processor-executable instructions stored in the computer-readable storage medium to:

identify, by a first node of the first set of nodes, the object for ingest into the first storage grid;

replicate, by the first node, the object to at least a second node of the first set of nodes and a third node of the first set of nodes in the first storage grid; and cross-grid replicate the object to a fourth node of the second set of nodes on the second storage grid.

15. The computer-readable storage medium of claim 13, wherein the first storage grid comprises a first set of nodes and the processor-executable instructions cause the one or more processors to further execute processor-executable instructions stored in the computer- readable storage medium to:

enqueue, by a first node of the first set of nodes, the object on a client queue for cross- grid replication;

remove, by the first node, the object from the client queue based on a timeout, wherein the timeout is based on a time duration that the object is in the client queue; and enqueue, by the first node, the object onto a scanner queue.

16. The computer-readable storage medium of claim 13, wherein the first storage grid comprises a first set of nodes and the processor-executable instructions cause the one or more processors to further execute processor-executable instructions stored in the computer-readable storage medium to:

scan, by a first node of the first set of nodes, a scanning list comprising objects for cross-grid replication, wherein the object is on the scanning list; and check, by the first node, whether the object has been cross-grid replicated by other nodes within the first set of nodes;

determine, by the first node, that a second node of the first set of nodes has initiated cross-grid replication of the object; and remove, by the first node, the object from the scanning list based on the second node initiating cross-grid replication of the object.

17. The computer-readable storage medium of claim 13, wherein the first storage grid comprises a first set of nodes, the second storage grid comprises a second set of nodes, and the processor-executable instructions stored in the computer-readable storage medium are further configured to cause the one or more processors to:

enqueue, by a first node of the first set of nodes, the object onto a scanning queue based on a token range associated with the first node, wherein:

each node within the first set of nodes is assigned a respective token range; and the object comprises a token within the token range of the first node; and cross-grid replicate, by the first node, the object to a second node of the second set of nodes on the second storage grid.

18. A method comprising:

ingesting an object into a first storage grid;

replicating the object to one or more nodes within the first storage grid;

enqueuing, by a first node of the one or more nodes within the first storage grid, the object into a queue for cross-grid replication;

determining, by the first node, a cross-grid replication status of the object based on the object as enqueued; and performing, by the first node, a cross-grid replication of the object to the second storage grid based on the cross-grid replication status of the object.

19. The method of claim 18, further comprising:

identifying the object for ingest into the first storage grid comprises:

identifying, by the first node of the one or more nodes, the object for ingest into the first storage grid; and replicating, by the first node, the object to at least a second node of the one or more nodes in the first storage grid; and enqueuing, by the first node, the object into the queue for cross-grid replication comprises:

enqueuing, by the first node, the object into a client queue for cross-grid replication of the object to the second storage grid.

20. The method of claim 18, further comprising:

enqueuing, by the first node, the object into the queue for cross-grid replication comprises:

enqueuing, by the first node, the object onto a scanner queue; and determining, by the first node, the cross-grid replication status of the object based on the object as enqueued comprises:

checking, by the first node, whether the object has been cross-grid replicated by other nodes within the one or more nodes.

21. The method of claim 18, further comprising:
enqueuing, by the first node, the object into the queue for cross-grid replication comprises:
    enqueuing, by the first node, the object onto a client queue for cross-grid replication; and
determining, by the first node, the cross-grid replication status of the object based on the object as enqueued comprises:
    checking, by the first node, whether the object has been cross-grid replicated by other nodes within the one or more nodes based on the object's position the client queue.

22. The method of claim 18, further comprising:
enqueuing, by the first node, the object into the queue for cross-grid replication comprises:
    enqueuing, by a first node of the one or more nodes, the object onto a client queue;
    removing, by the first node, the object from the client queue based on a timeout, wherein the timeout is based on at time duration that the object is in the client queue;
    scanning, by the first node, a scanning list comprising objects for cross-grid replication, wherein the object is on the scanning list after removal from the client queue; and
    enqueuing, by the first node, the object onto a scanning queue.

23. The method of claim 18, wherein performing, by the first node, the cross-grid replication of the object to the second storage grid based on the cross-grid replication status of the object comprises:
    establishing a client connection between the first node of the first storage grid and a gateway of the second storage grid; and
    performing, by the first node, the cross-grid replication of the object to the second storage grid via the client connection.

24. A computing apparatus comprising:
a computer-readable storage medium;
processor-executable instructions stored on the computer-readable storage medium; and
one or more processors coupled to the computer-readable storage medium and configured to execute the processor-executable instructions, wherein the processor-executable instructions, when executed by the one or more processors, direct the computing apparatus, to at least:
    identify an object for ingest into a first distributed storage system comprising a first plurality of nodes distributed across multiple sites and accessible via a first namespace;
    replicate the object to one or more nodes within the first distributed storage system;
    scan, by a first node of the first plurality of nodes, a scanning list comprising objects for cross-grid replication based on a token range associated with the first node, wherein the object is on the scanning list and each node within the first plurality of nodes is assigned a respective token range;
    determine, by the first node, a cross-grid replication status of the object to a second distributed storage system based on the scanning list; and perform, by the first node, a cross-grid replication of the object to the second distributed storage system based on the cross-grid replication status of the object.

25. The computing apparatus of claim 24, wherein:
the processor-executable instructions to identify the object for ingest into the first distributed storage system, when executed by the one or more processors, further direct the computing apparatus to:
    identify, by the first node of the first plurality of nodes, the object for ingest into the first distributed storage system; and
    replicate, by the first node, the object to at least a second node of the first plurality of nodes in the first distributed storage system; and
    cross-grid replicate the object to a third node on the second distributed storage system.

26. The computing apparatus of claim 24, wherein the processor-executable instructions, when executed by the one or more processors, further direct the computing apparatus to:
    enqueue, by the first node, the object on a client queue for cross-grid replication;
    remove, by the first node, the object from the client queue based on a timeout, wherein the timeout is based on a time duration that the object is in the client queue; and
    enqueue, by the first node, the object onto a scanning queue based on the token range associated with the first node, wherein:
    the scanning list corresponds to the scanning queue; and
    the object comprises a token within the token range of the first node.

27. The computing apparatus of claim 24, wherein:
the processor-executable instructions, when executed by the one or more processors, further direct the computing apparatus to:
    enqueue, by the first node, the object onto a scanner queue; and
    check, by the first node, whether the object has been cross-grid replicated by any other node within the first plurality of nodes; and
    cross-grid replicate, by the first node, the object to a second node on the second distributed storage system.

28. The computing apparatus of claim 24, wherein the processor-executable instructions to determine, by the first node, the cross-grid replication status of the object to the second distributed storage system based on the scanning list, when executed by the one or more processors, further direct the computing apparatus to:
    check, by the first node, whether the object has been cross-grid replicated by other nodes within the first plurality of nodes based on the scanning list.

29. The computing apparatus of claim 24, wherein the processor-executable instructions to perform, by the first node, the cross-grid replication of the object to the second distributed storage system, when executed by the one or more processors, further direct the computing apparatus to:
    cross-grid replicate the object to the second distributed storage system via a client connection between the first node in the first distributed storage system and a gateway in the second distributed storage system.

* * * * *